(12) United States Patent  (10) Patent No.: US 9,211,895 B2
Chapman  (45) Date of Patent: Dec. 15, 2015

(54) CAMERA DOLLY

(71) Applicant: CHAPMAN/LEONARD STUDIO EQUIPMENT, INC., North Hollywood, CA (US)

(72) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 0 days.

(21) Appl. No.: 14/292,422

(22) Filed: May 30, 2014

(65) Prior Publication Data

US 2015/0175182 A1 Jun. 25, 2015

Related U.S. Application Data

(63) Continuation-in-part of application No. 14/186,444, filed on Feb. 21, 2014, which is a continuation-in-part of application No. 14/135,122, filed on Dec. 19, 2013.

(51) Int. Cl.
*B62B 3/00* (2006.01)
*F16M 11/42* (2006.01)

(52) U.S. Cl.
CPC .............. *B62B 3/001* (2013.01); *F16M 11/42* (2013.01)

(58) Field of Classification Search
CPC B60B 33/0055; B60B 33/0057; B62B 3/001; B62B 3/008; B62B 11/00; B62B 2301/06
USPC ................. 180/47.11, 47.34, 98, 99
See application file for complete search history.

(56) References Cited

U.S. PATENT DOCUMENTS

| 2,228,247 | A | 1/1941 | Cunningham |
| 2,995,380 | A | 8/1961 | King |
| 4,248,444 | A | 2/1981 | Johnson |
| 4,890,971 | A | 1/1990 | Heger |
| 4,950,120 | A | 8/1990 | Barnes |
| 4,950,126 | A | 8/1990 | Fabiano et al. |
| 5,197,700 | A | 3/1993 | Chapman |
| 5,516,070 | A | 5/1996 | Chapman |
| 5,697,757 | A | 12/1997 | Lindsay |

(Continued)

FOREIGN PATENT DOCUMENTS

| DE | 8527486 U1 | 2/1986 |
| WO | 92/06034 A1 | 4/1992 |

OTHER PUBLICATIONS

Chapman/Leonard Studio Equipment, Inc., 2008-2010 Catalog, pp. 1, 72-73, 77, 80-82, and 100.

(Continued)

*Primary Examiner* — Hau Phan
*Assistant Examiner* — Bryan Evans
(74) *Attorney, Agent, or Firm* — Kenneth H. Ohriner; Perkins Coie LLP

(57) ABSTRACT

A steering bar engageable with and removable from a steering mode transmission in a camera dolly or pedestal. The steering bar has a handle attached to an upper end of a slot tube, with the slot tube telescopically slidable into or over a base tube, and keyed to the base tube. A shift rod has an upper end connected to a shift cap at the steering bar and a lower end connectable to the steering transmission. A clamp clamps onto the shift rod and is axially movable with the handle bar, to allow shifting steering modes via movement of the shift cap, with the steering bar at any selected height.

20 Claims, 24 Drawing Sheets

(56) References Cited

U.S. PATENT DOCUMENTS

| | | |
|---|---|---|
| 5,730,450 A | 3/1998 | Chapman |
| 5,820,088 A | 10/1998 | Chapman |
| 6,050,575 A | 4/2000 | Lindsay |
| 6,073,903 A | 6/2000 | Lindsay |
| 6,135,465 A | 10/2000 | Chapman |
| 6,520,642 B1 * | 2/2003 | Chapman ............. 352/243 |
| 6,520,645 B2 | 2/2003 | Yamamoto et al. |
| 6,572,059 B1 | 6/2003 | Chapman |
| 6,626,117 B1 | 9/2003 | Chapman |
| 7,658,359 B2 | 2/2010 | Jones et al. |
| 7,845,602 B1 | 12/2010 | Young et al. |
| 8,282,213 B2 * | 10/2012 | Chapman ............. 352/243 |

OTHER PUBLICATIONS

Vinten Camera Support Systems, Jan. 2013 Catalog, pp. 1, 25, and 34-37.

United States Patent and Trademark Office, Non-final Office Action issued in U.S. Appl. No. 14/186,444 (Dec. 8, 2014).

European Patent Office, European Search Report issued in EP Patent Application No. 14196589.7 (Jun. 24, 2015).

* cited by examiner

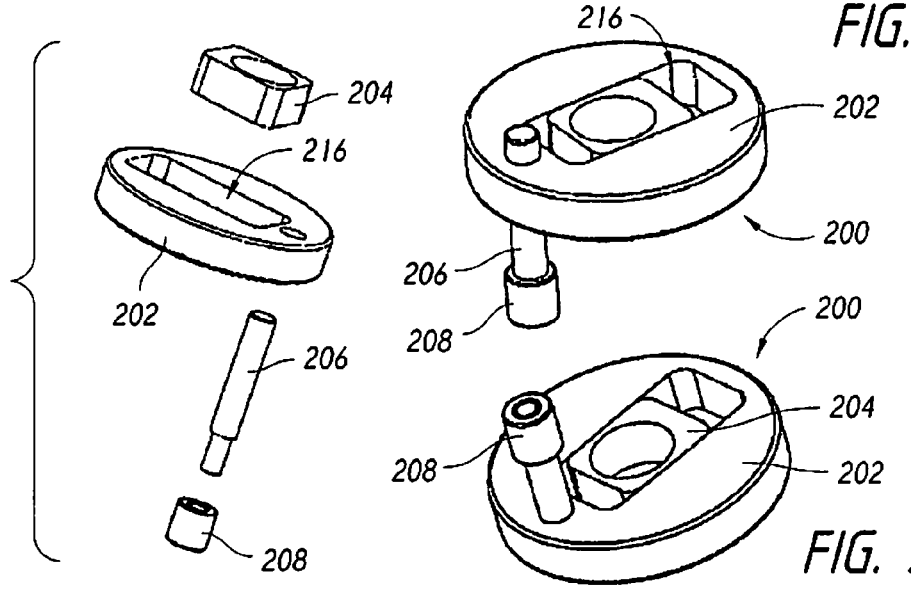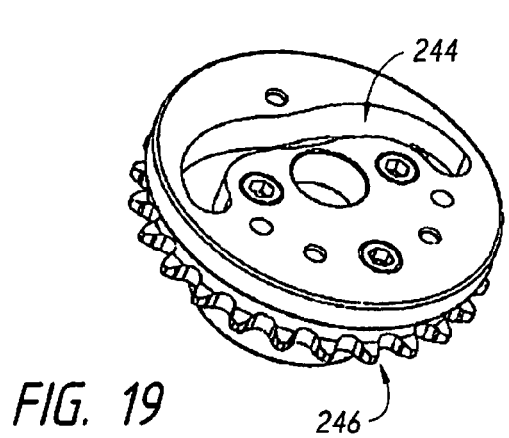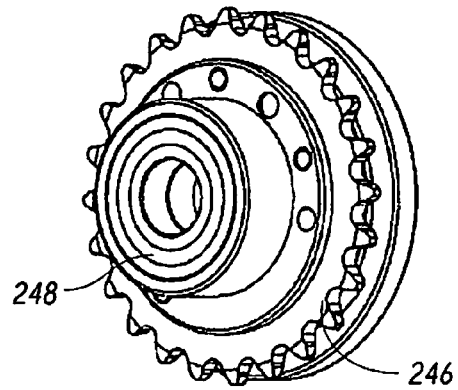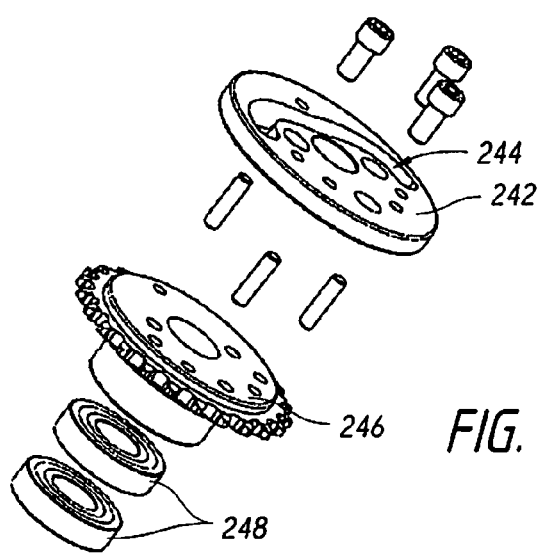

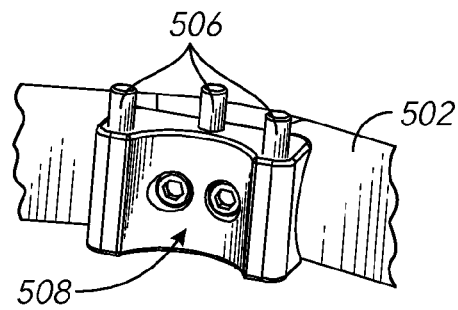
FIG. 37
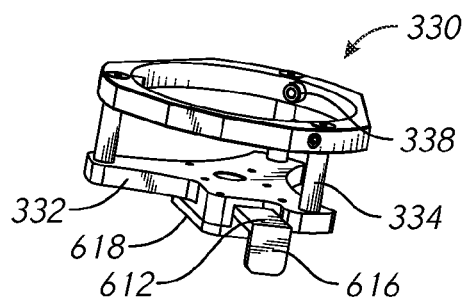
FIG. 43
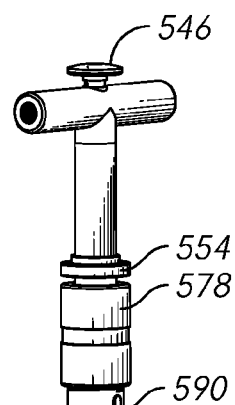
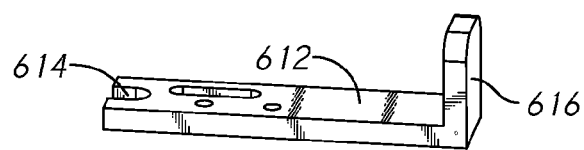
FIG. 44
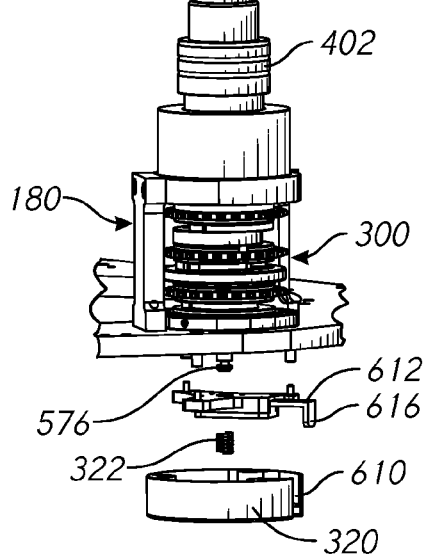
FIG. 38
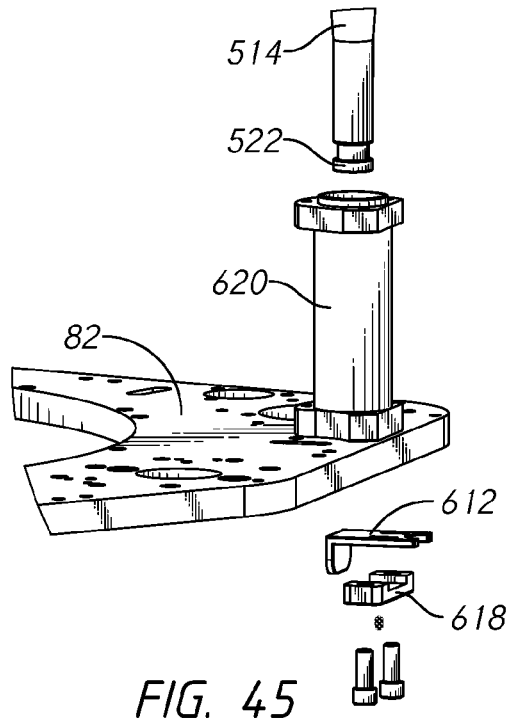
FIG. 45

CAMERA DOLLY

This Application is a Continuation-in-Part of U.S. patent application Ser. No. 14/186,444 filed Feb. 21, 2014 and now pending, which is a Continuation-in-Part of U.S. patent application Ser. No. 14/135,122 filed Dec. 19, 2013, now pending. Both of these applications are incorporated herein by reference.

BACKGROUND OF THE INVENTION

Video, television, and motion picture cameras must often be positioned in a particular way for a video or film sequence. The camera must also move to follow an action sequence or obtain a desired cinematographic effect. Generally, all movement of the camera must be uniform and smooth without any bumping, rocking, tilting, vibration or other movement that will cause the recorded images to jump when viewed on a screen. A camera dolly or camera dolly is used to provide smooth camera movement.

Conventional camera dollies and pedestals have steering systems which positively steer the wheels of the dolly via the operator turning a steering bar or handle. Steering and positioning the dolly may be challenging, even for an experienced operator, because precise positioning and timing is often required. Many camera dollies having a steering transmission which allows the dolly to be steered in either a crab mode or a corrective mode. The ability to shift between steering modes can help the camera dolly operator move the dolly as desired. Still, improved camera dollies are needed and engineering design challenges remain in designing camera dollies.

BRIEF DESCRIPTION OF THE DRAWINGS

In the drawings the same element number indicates the same element in each of the views.

FIG. 19 is a top perspective view of the bottom sprocket assembly shown in FIG. 14.

FIG. 20 is a bottom perspective view of the bottom sprocket assembly shown in FIGS. 14 and 19.

FIG. 21 is an exploded perspective view of the bottom sprocket assembly shown in FIGS. 19 and 20.

FIG. 22 is a top perspective view of the differential shown in FIG. 14.

FIG. 23 is a bottom perspective view of the differential shown in FIGS. 14 and 22.

FIG. 24 is an exploded perspective view of the differential shown in FIGS. 14, 22 and 23.

FIG. 37 is an enlarged perspective view of the pin fitting on the push bar shown in FIG. 36.

FIG. 38 is a perspective view of an adjustable height steering handle.

FIG. 43 is a perspective view of the shift frame shown in FIG. 38.

FIG. 44 is a perspective view of the slide lock shown in FIG. 38.

FIG. 45 is a perspective view of a lower end of a leg of the push bar shown in FIG. 36 and a received tube on a dolly chassis.

DETAILED DESCRIPTION OF THE DRAWINGS

Figure 1:
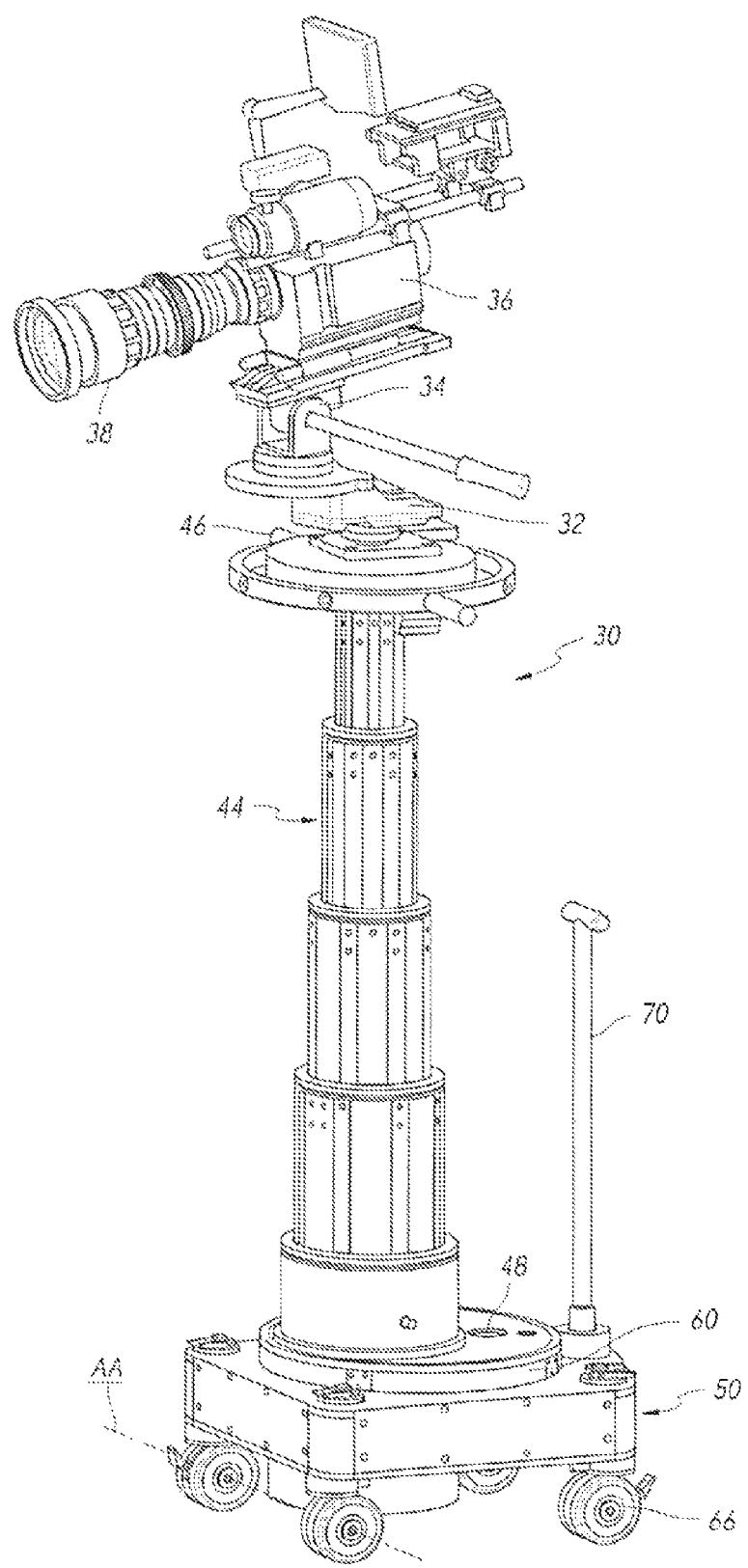
FIG. 1 is a perspective view of a camera dolly.

As shown in FIG. 1, a camera dolly 30 includes a base 50 which rolls on wheels. A telescoping column 44 may be removably supported on or in the base 50, with a tank 48 at the lower end of the column 44 positioned within a ring 60 of the base 50. The column may be provided as described in U.S. Pat. Nos. 5,197,700; 5,516,070 or 5,820,088, incorporated herein by reference. Similarly, various alternative telescoping columns, including electrically powered and mechanically weight compensated columns may be used. The base 50 may alternatively be used with a fixed height column or riser, for example with the base 50 having a flat closed top deck with no ring 60. That is the base 50 may alternatively be used as a camera dolly, with a boom arm, seating accessories, etc.

In a typical set up as shown in FIG. 1, a swing head 32 is mounted on the column platform 46. A pan-tilt head 34 is attached onto the swing head 32, and a camera 36 having a lens 38 is attached to the pan-tilt head 34. Of course the type of heads used on the dolly, if any, will vary depending on the use contemplated.

Figure 2:
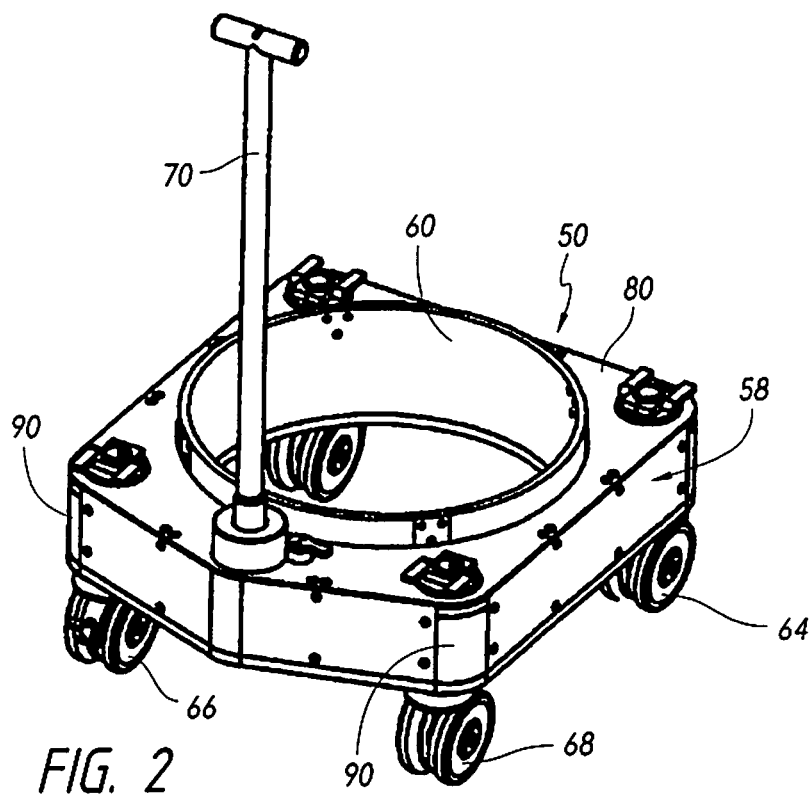
FIG. 2 is a perspective view of the base of the camera dolly of FIG. 1 shown separately.
Figure 3:
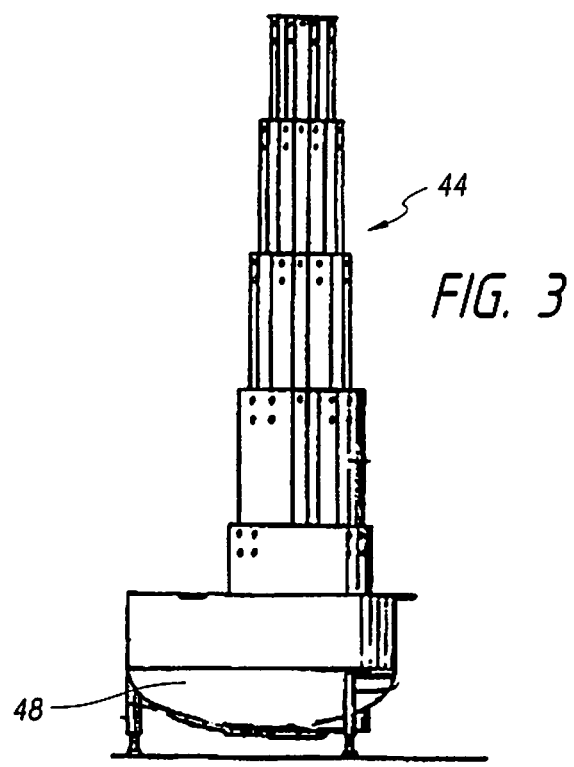
FIG. 3 is a side view of the column of the camera dolly of FIG. 1 shown separately.

FIG. 2 shows the base 50 with the column 44 removed. As shown in FIG. 3 the column 44 may be removed from the base 50 and used alone. The base 50 modified to cover or omit the central opening within the ring 60, may also be used alone, or used apart from any column.

Figure 4:
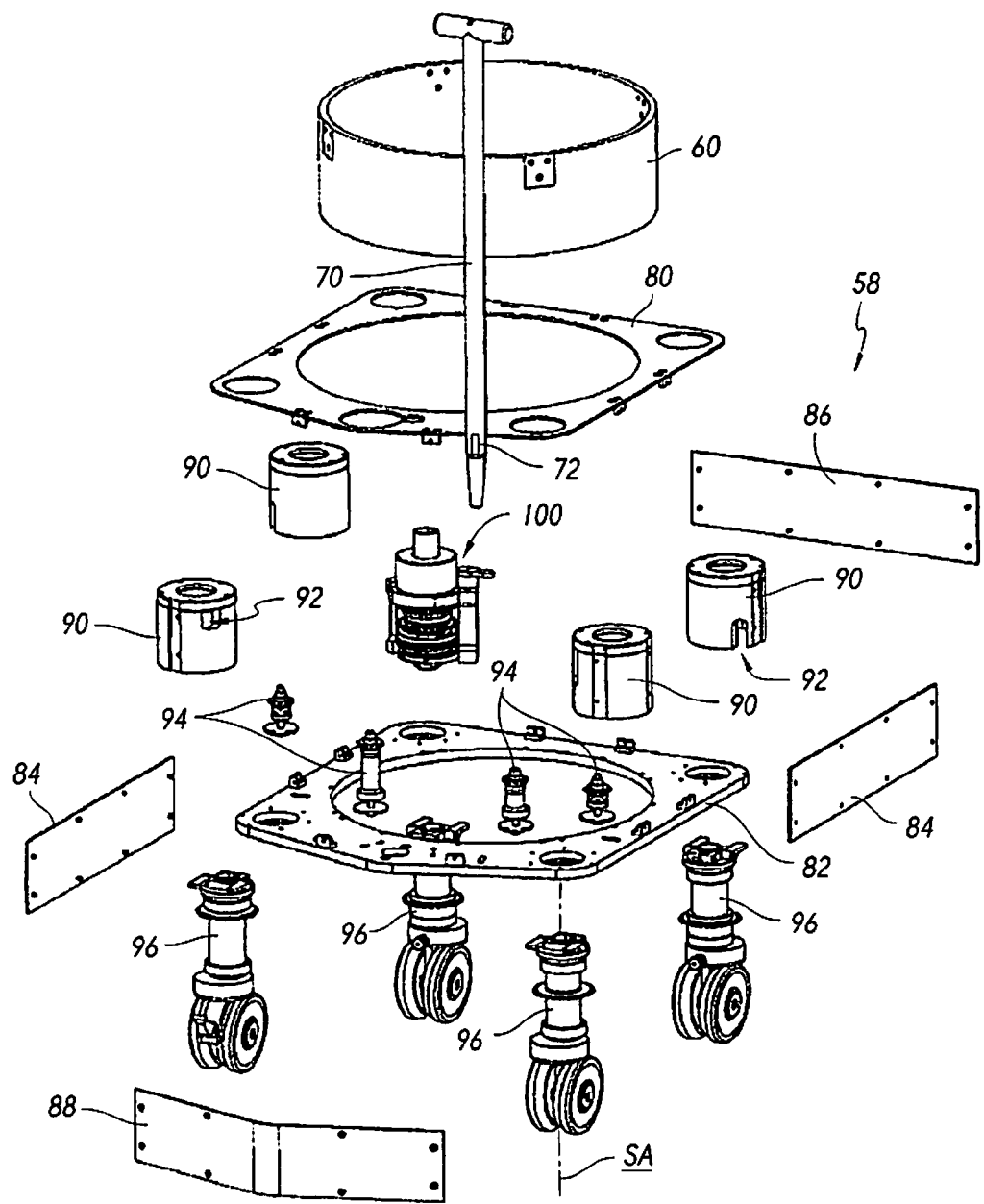
FIG. 4 is an exploded perspective view of the base shown in FIG. 2, with the steering chains removed for clarity of illustration.

Referring to FIG. 4, the base 50 may be constructed with a top plate 80 supported on sprocket housings 90 position near the corners of a bottom plate 82, with side plates 84, a rear plate 88 and a front plate 86 forming an enclosed chassis 58. As shown in FIG. 2, the outside cylindrical surface of each of the sprocket housings 90 may have relieved sections or slots to allow the plates 84, 86 and 88 to fit near flush, with the sprocket housings 90 providing structural attachment for the plates 84, 86 and 88, as well as for the top and bottom plates. Each of the four sprocket housings 90 may have the same design, except for the positions of the chain slots 92 further described below.

Figure 9:
FIG. 9 is a perspective view of the leg assembly shown in FIG. 8.
Figure 10:
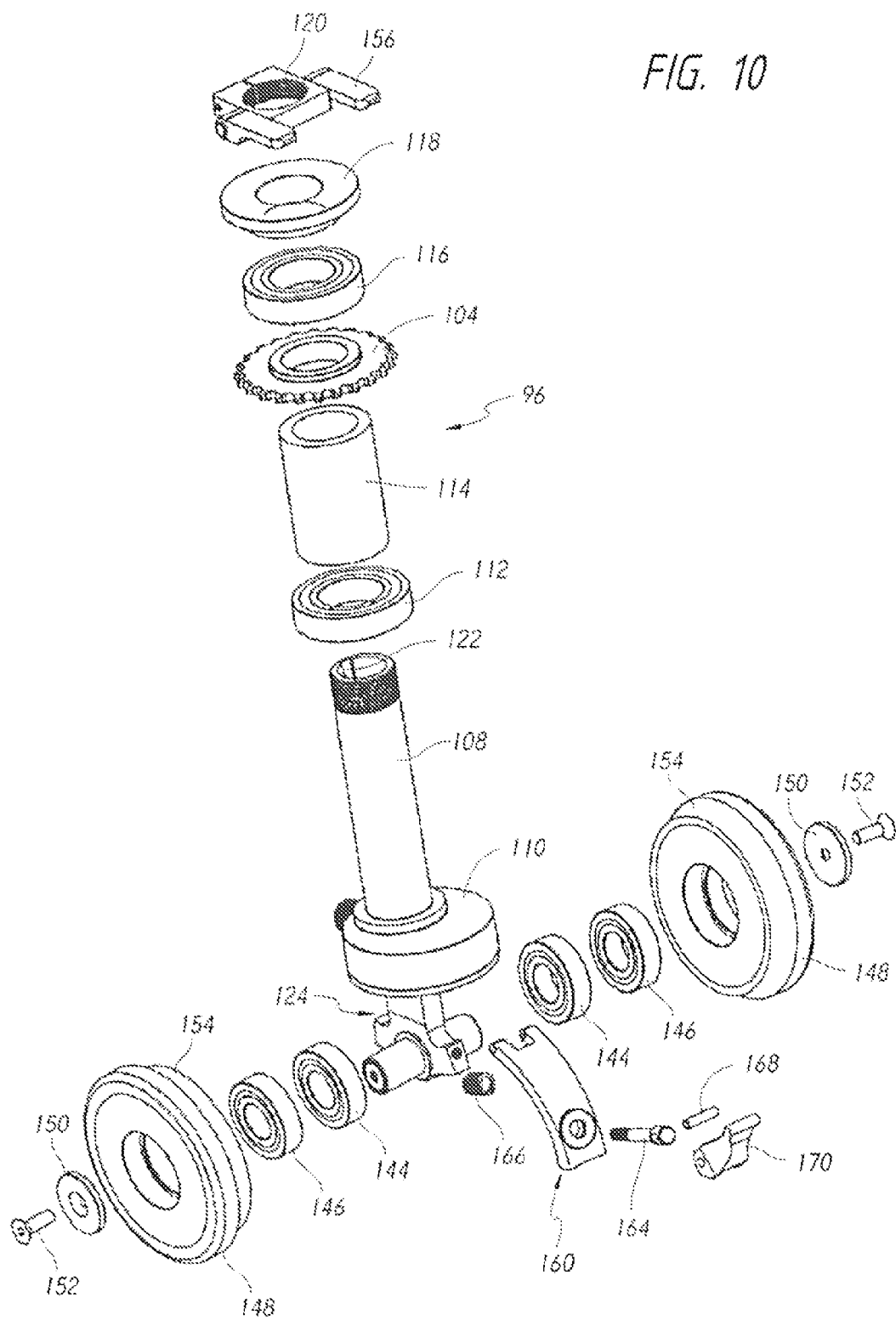
FIG. 10 is an exploded perspective view of the entire leg assembly shown in FIG. 5.
Figure 11:
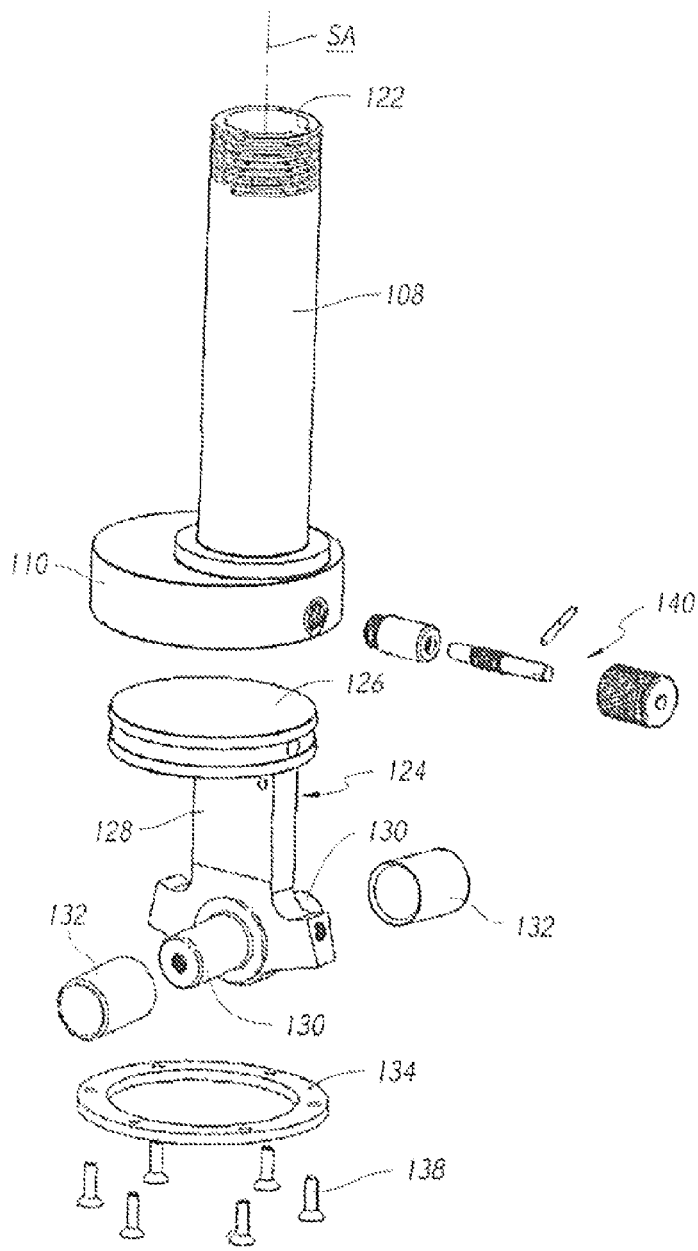
FIG. 11 is an exploded perspective view of the leg assembly shown in FIG. 10 with the axle frame separated from the riser, and with components omitted, for purpose of illustration.

Turning now to FIGS. 4-11, a leg assembly 96 is provided near each corner of the chassis 58. As shown in FIG. 11, each leg assembly 96 may include a riser 108 having an externally threaded upper end, optionally with a key way 122 in the inner cylindrical wall of the riser 108. The riser may be joined to a cup 110. An axle frame 124 has a disk 126 rotatably positioned within the cup 110, with an offset arm 128 joined to the bottom side of the disk 126, at an off center position. Axles 130 on the arm 128 may extend down at a slight angle. Each leg assembly 96 is rotatable about a steering axis SA extending centrally and vertically through the leg assembly 96.

Referring still to FIG. 11, a retainer ring 134 and bolts 138 may retain the disk 126 within the cup 110. A fastener, such a pin or bolt may be used to temporarily allow rotational movement between the axle frame and the riser, to shift between normal and caster mode configurations. The drawings show a thumbscrew 140 threaded into one side of the cup 110 for this purpose. When the thumbscrew 140 is loosened, the axle frame 124 can be rotated within the cup 110, to change the alignment between the riser 108 and the offset arm 128.

As shown in FIG. 11, a hardened axle sleeve 132 may be pressed onto each axle 130, with a wheel 148 mounted on inner and outer bearings 144 and 146 on the axle 130. A wheel bolt 152 and cap 150 may be used to secure the wheel 148 in place. As shown in FIG. 10, a brake assembly 160 may be provided on each leg assembly 96, or more typically on the rear left and rear right leg assemblies. If used, the brake assembly 160 may be provided with a brake arm 162 pivotally attached to the axle frame 124, with a spring 166 pushing the brake arm 162 up and away from the wheels 148. A brake lever 170 having a cam surface is pivotally attached to the head of a bolt 164 via a pin 164, with the bolt 164 threaded into the axle frame 124. With the lever 170 in the up position, the spring 166 holds the arm 162 up and out of contact with the inner surface 154 of the wheels 148, so that the wheels roll freely. The brake is actuated by pushing the lever 170 down causing the bottom surface of the lever 170 to forcibly contact the inner surface 154 of the wheel 148, preventing the wheel from rolling. The lever 170 may be foot-operated.

Figure 5:
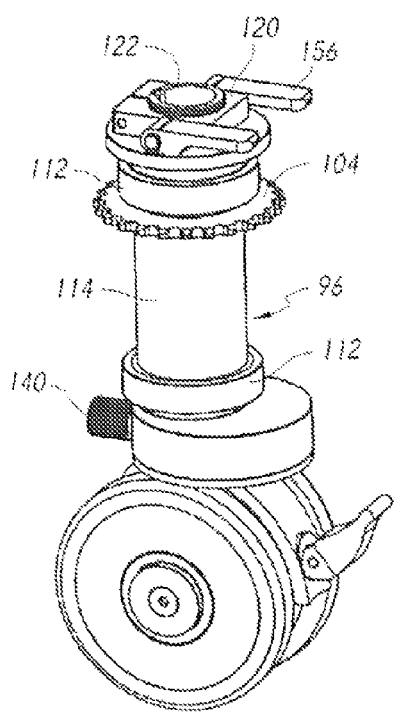
FIG. 5 is a perspective view of one of the leg assemblies of the base as shown in FIG. 4.
Figure 6:
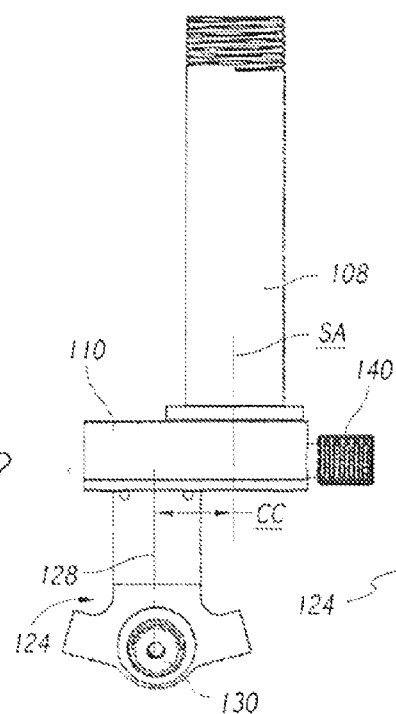
FIG. 6 is a side view of the leg assembly of FIG. 5 in the caster position, with components omitted for purpose of illustration.
Figure 7:
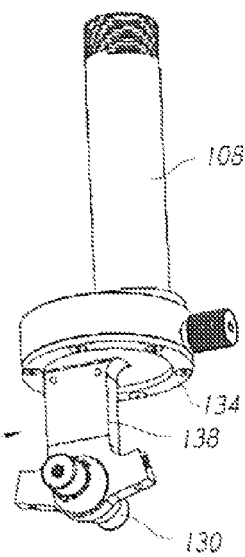
FIG. 7 is a perspective view of the leg assembly shown in FIG. 6.
Figure 12:
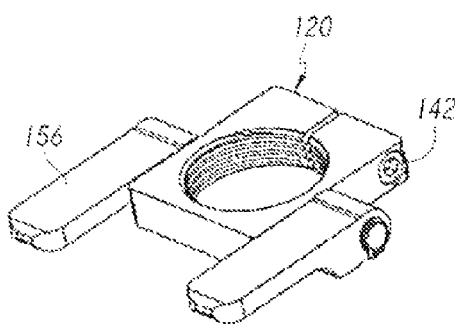
FIG. 12 is a perspective view of the cam lock shown in FIGS. 1, 2, 5 and 10.

Referring to FIGS. 5, 10 and 12, a lower bearing 112, a sleeve 114, a leg sprocket 104, an upper bearing 116 and a pressure plate 118 are provided on the riser 108. During assembly a cam lock 120 is threaded down onto the top end of the riser 108 to a position where it securely holds together the components on the riser 108. A cross bolt 142 is then tightened clamping the split collar of the cam lock 120 onto the riser 108. Referring to FIG. 10, with the tabs or levers 156 of the cam lock 120 in the down position, the cam lock 120 presses the pressure plate 118 down clamping the inner races of the bearings 112 and 116 against the sprocket 104, locking the sprocket 104 to the riser 108. Turning movement of the sprocket 104 then necessarily rotates the entire leg assembly 96 during use. With the levers 156 in the up position, the sprocket 104 is released, allowing the leg assembly 96 to rotate independently of the sprocket 104.

The four leg assemblies 96 may have the same design, except for the vertical position of the leg sprocket, and with the rear leg assemblies also shown with brakes 160. Although wheel pairs are shown in the drawings, the base may also be designed with a single wheel on each leg assembly. As used here, wheel set means a single wheel or dual wheels as shown. FIG. 5 shows the rear left leg assembly having leg sprocket 104. The other leg sprockets are the rear right sprocket 106 on the rear right leg assembly, the front leg sprockets 102 on the left and right front leg assemblies.

Turning to FIGS. 13, 14, 25 and 26, the base 50 may be provided with a steering system generally designated 52 having a steering transmission 100 and chains connecting transmission sprocket assemblies 188, 220 and 240 in the transmission 100 with the leg sprockets 102, 104 and 106 on the leg assemblies 96. The transmission 100 may be contained within a housing 180 having a cap 182 extending up through an opening at a rear central position of the top plate 80 of the base chassis 58, with side plates 210 of the housing 180 bolted onto the bottom plate 82.

Figure 13:
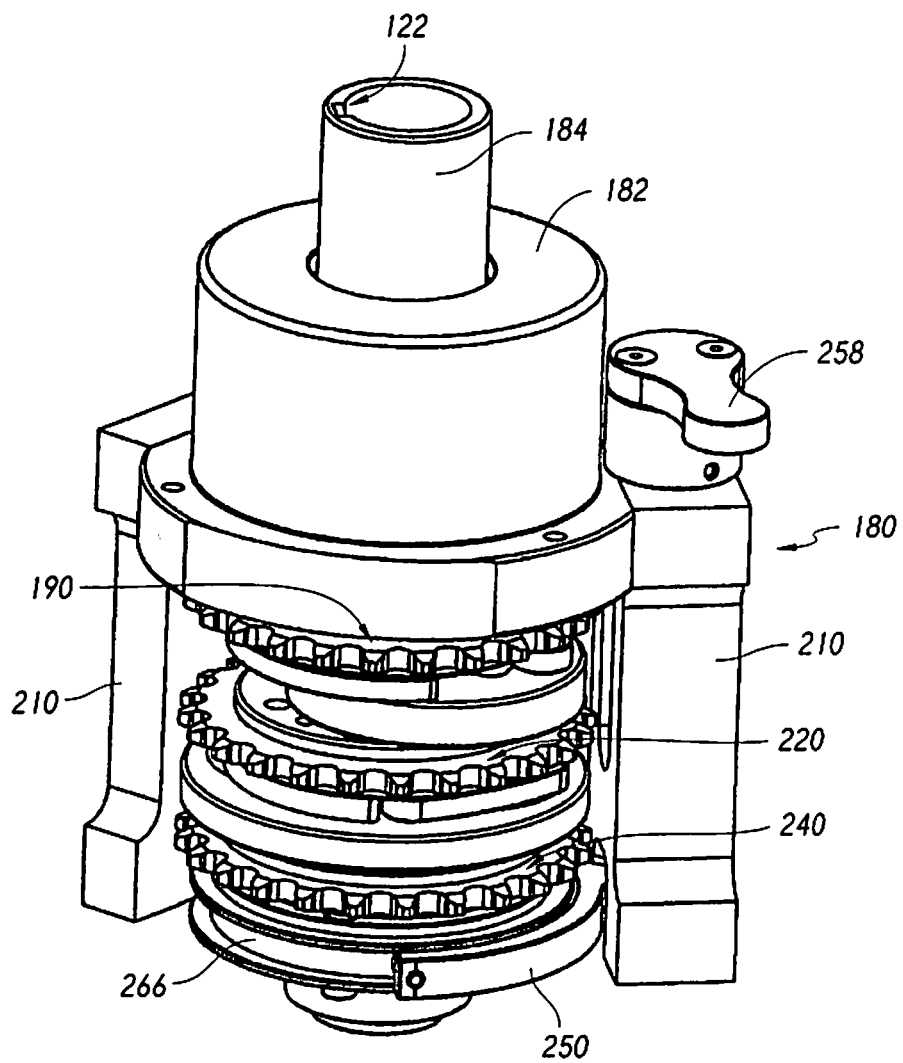
FIG. 13 is a perspective view of the steering transmission shown in FIG. 4.
Figure 14:
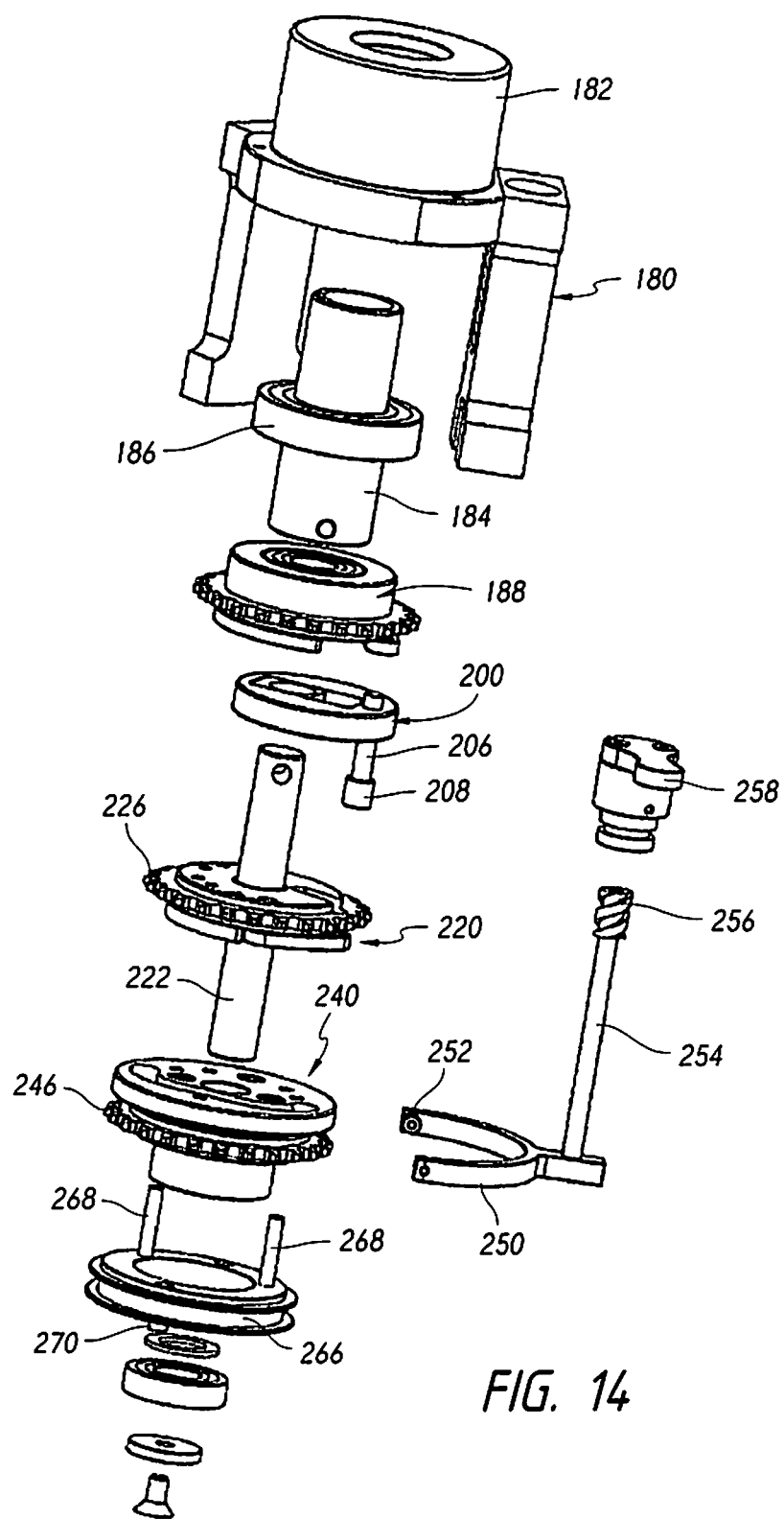
FIG. 14 is an exploded perspective view of the steering transmission shown in FIG. 13.
Figures 17, 18:
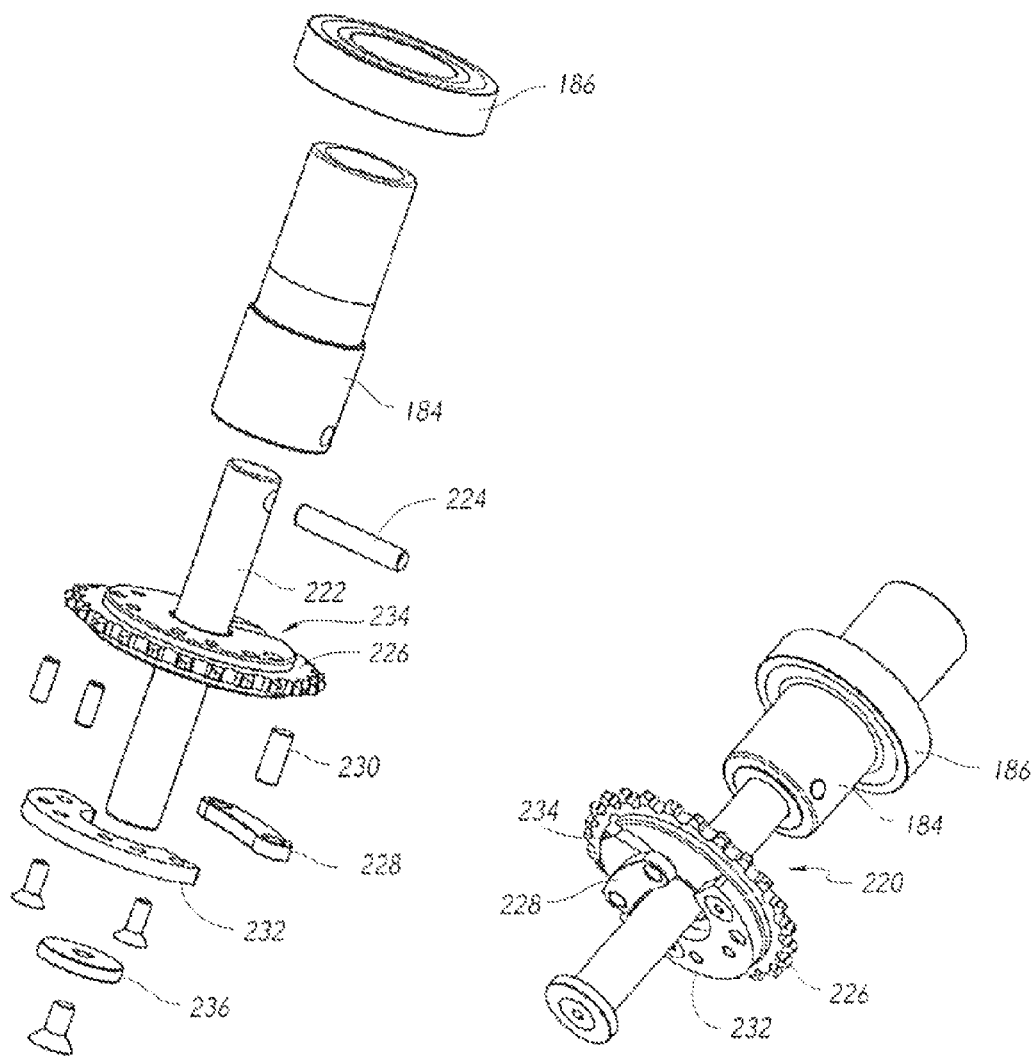
FIG. 17 is a perspective view of the middle sprocket assembly shown in FIG. 14.
FIG. 18 is an exploded perspective view of the middle sprocket assembly shown in FIG. 17.

The steering transmission may have an axle 222 passing centrally through top, middle and bottom sprocket assemblies. As shown in FIGS. 14 and 18, the axle is rigidly attached to a shaft 184 via an axle pin 224. The top end of the shaft 184 may extend up through the cap 182, as shown in FIGS. 1 and 13. Referring back to FIG. 16, bearings 192 on or in the top sprocket assembly 188 allow the top sprocket 190 to rotate freely on the axle 222, and allow the shaft 184 to rotate freely within the transmission housing 180.

Figure 15:
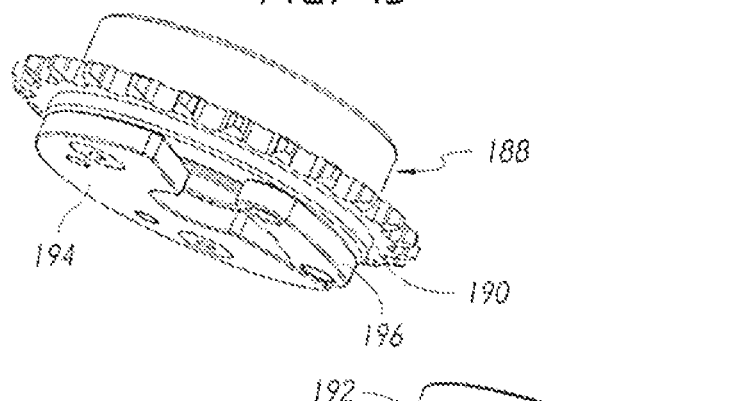
FIG. 15 is a perspective view of the top sprocket assembly shown in FIG. 14.
Figure 16:
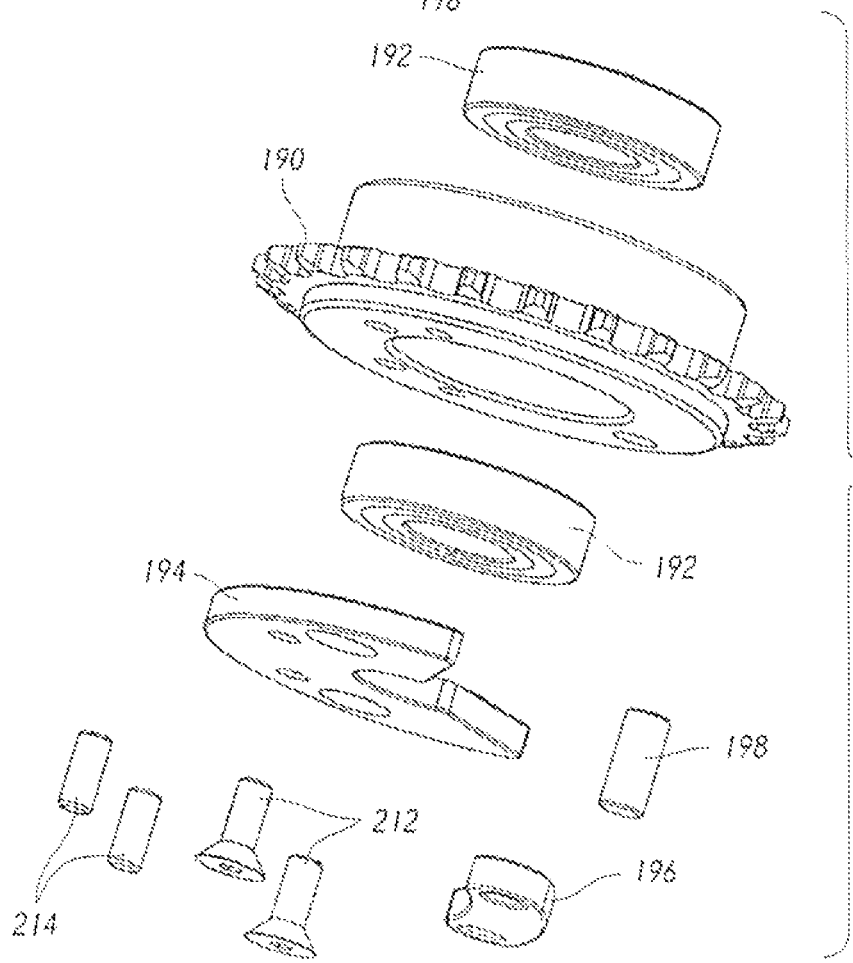
FIG. 16 is an exploded perspective view of the top sprocket assembly shown in FIG. 15.

Referring to FIGS. 15 and 16, the top sprocket assembly 188 has a C-plate 194 rigidly attached to a top sprocket 190 via bolts 214 and/or pins 212. An arm 196 is pivotally attached to the top sprocket 190 on a pivot pin 198. Referring to FIGS. 17 and 18, in the middle sprocket assembly 220, a middle sprocket 226 is rigidly attached to and rotates with the axle 222. Similar to the top sprocket assembly 188, in the middle sprocket assembly 220 a C-plate 232 is rigidly attached to the bottom surface of the middle sprocket 226, and an arm 228 is pivotally pinned or attached the bottom surface of the middle sprocket 226. A sprocket through slot 234 in the middle sprocket 226 extends generally radially outwardly from near the axle 222 to near the teeth on the outer circumference of the sprocket 226.

As shown in FIG. 20, the bottom sprocket 246 is rotatably mounted on bearings 248 on the axle 222 so that it can rotate free of the axle. As shown in FIG. 19 a contoured roller slot 244 is provided in the top surface of the bottom sprocket 246. Referring to FIGS. 14 and 22-24, a differential 200 is provided between the top and middle sprockets. The differential 200 may include a slider 204 which slides in a slot 216 in a differential plate 202. The axle 222 extends through a central clearance opening in the slider 204, holding the slider 204 in a central position while allowing the axle 222 to rotate relative to the slider 204, and allowing the differential plate 202 to shift into off-center positions. A roller pin 206 rigidly attached to the outer end of the arm 196, extends down through the sprocket slot 234 in the middle sprocket 226 and through a clearance hole in the outer end of the arm 228, with a roller 208 rotatably attached onto the lower end of the pin 206 positioned in the roller slot 244 in the top surface of the bottom sprocket 246. The shape of the roller slot 244 which provides corrective steering, may be determined directly based on the lateral wheelbase or spacing between the steering axis of the left side and right side leg assemblies, by sequentially plotting points that provide steering geometry as shown in FIG. 47A of U.S. Pat. No. 6,520,642.

Turning back to FIG. 14, a fork ring 266 has shift pins 268 projecting up through holes in the bottom sprocket 246. A fork 250 has rollers 252 positioned within a groove in the fork ring 266. A shaft 254 attached to the fork 250 has a lead screw 256 engaged with a fork lever 258. Turning the fork lever 258, e.g., ¼ turn, lifts and lowers the fork 250, moving the fork ring 266 into an up position, where the shift pins 268 extend into holes in the middle sprocket 226, and moving the fork ring 266 into a down position, where the shift pins 268 are withdrawn from the middle sprocket 226. Lock pins 270 extend down from the bottom surface of the fork ring 266. With the fork ring 266 in the down position, the lock pins project into openings in the bottom plate 82, locking the fork ring 266, and the bottom sprocket 246, so that they cannot rotate. With the fork ring 266 in the up position the lock pins 270 are withdrawn from the openings in the bottom plate so that the fork ring 266 and the bottom sprocket 246 are free to rotate.

Camera dollies often have steering systems to provide corrective steering or crab steering, or both. Optionally a round steering mode may also be included. The steering geometry and principles of these steering modes are described in U.S. Pat. No. 6,520,642, incorporated herein by reference.

Figure 25:
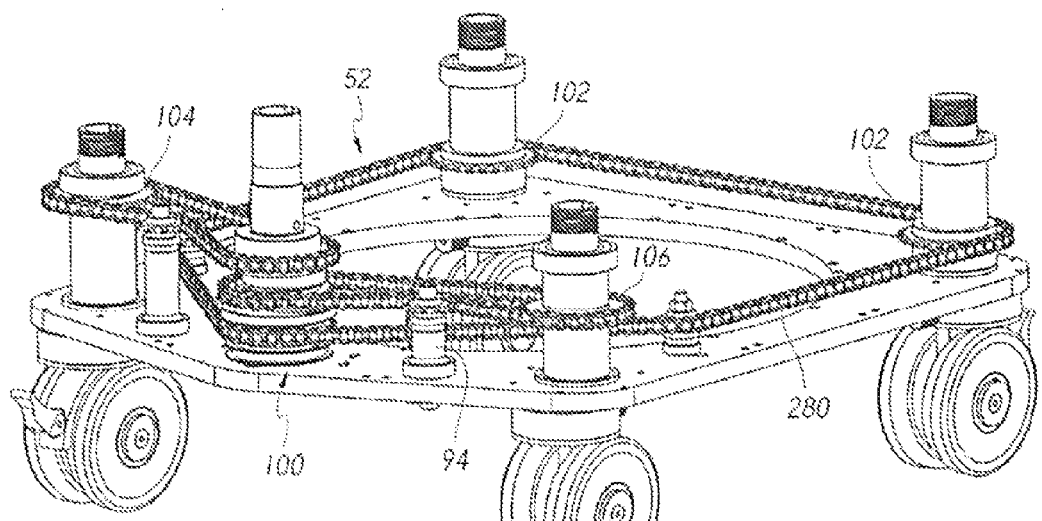
FIG. 25 is top, rear and right side view of the base shown in FIGS. 2 and 4, with components removed for clarity of illustration.
Figure 26:
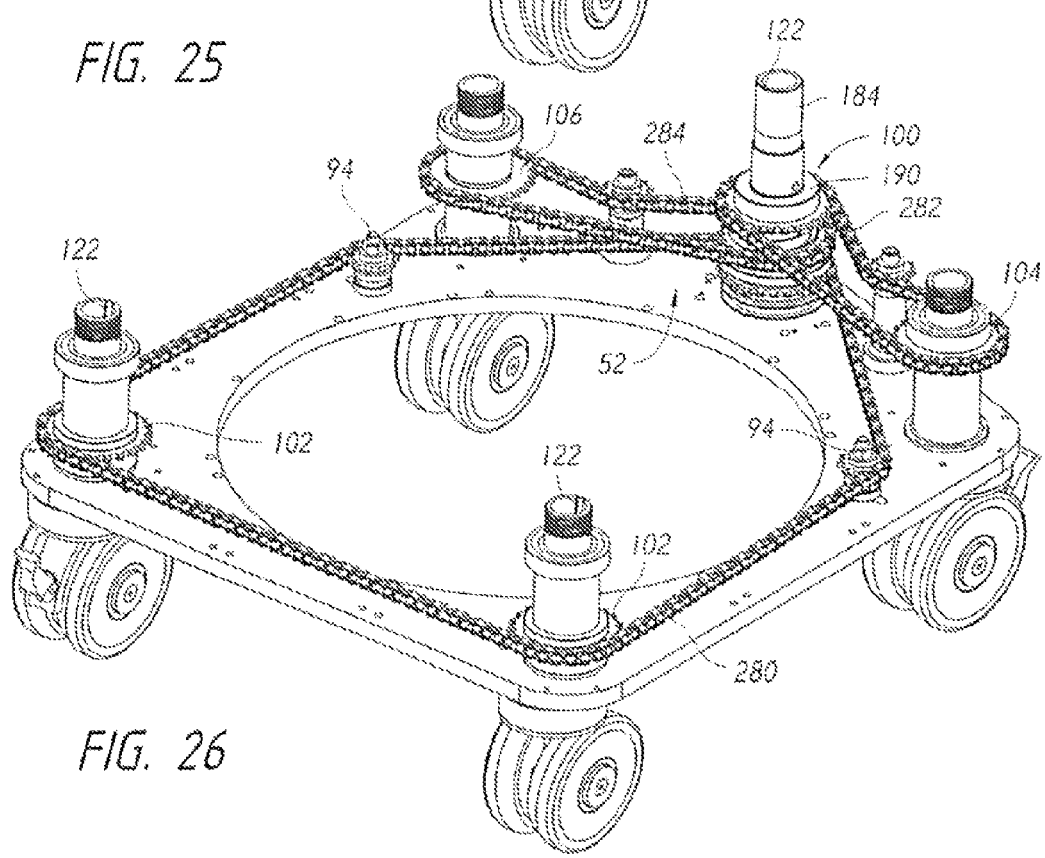
FIG. 26 is top, front and left side view of the base shown in FIGS. 2 and 4, with components removed for clarity of illustration.

As shown in FIGS. 25 and 26 the steering system 52 has a crab chain 280, a left chain 282 and a right chain 284. The crab chain 280 extends continuously around the front sprockets 102 on the left and right front leg assemblies 96 and also around the bottom sprocket 246 of the steering transmission. The left chain 282 extends continuously around the left rear sprocket 104 and around the top sprocket 190 of the steering transmission 100. The right chain 284 extends continuously around the right rear sprocket 106 and around the middle sprocket 226 of the steering transmission 100. Idlers 94 are provided to maintain the chains appropriately tensioned and positioned. As shown in FIGS. 25 and 26, the front sprockets 102 are both at a low vertical position on the leg assembly 96, the right rear sprocket 106 is at an intermediate vertical position and the left rear sprocket 104 is at a high vertical position. The chains 280, 282 and 284 are at corresponding vertical positions, to provide clearance between them.

Figure 8:
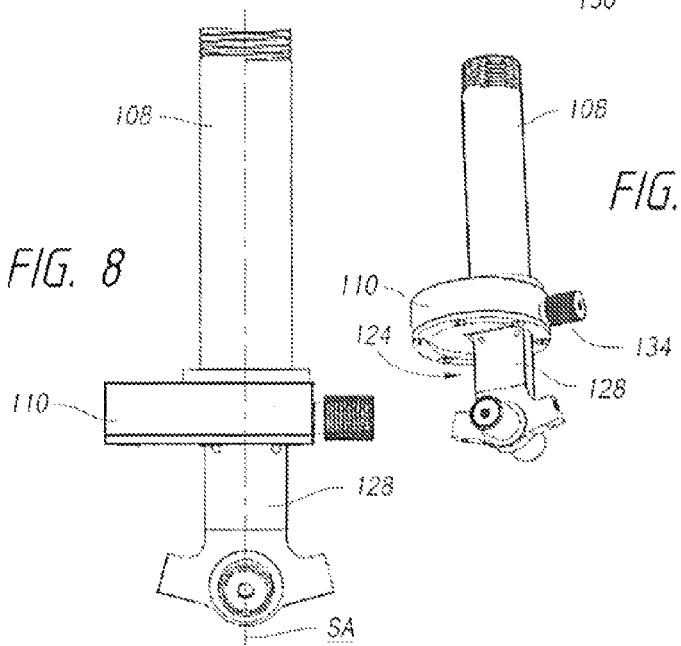
FIG. 8 is a side view of the leg assembly of FIG. 5 in the steer position, with components omitted for purpose of illustration.

The steering system 52 is engaged by locking the cam locks 120. At each leg assembly 96, locking the cam lock 120 clamps the sprocket 102, 104 or 106 of the leg assembly to the riser 108 so that they both rotate together. The wheels are aligned in the straight ahead position before locking the cam locks 120. The steering bar 70 is inserted into the shaft 184 with the key 72 in the keyway 122, so that rotating the steering bar 70 rotates the shaft 184 and the axle 222. The leg assemblies 96 are in the normal position as shown in FIGS. 8 and 9, with the axles 130 on the centerline of the riser 108.

For crab steering, where all of the wheel sets are steered to the same angle, the shift lever 258 is turned to move the fork ring 266 into the up position. The lock pins 270 are withdrawn from the openings in the bottom plate 82, or other fixed element, so that the bottom sprocket can freely rotate. Turning movement of the steering bar turns the axle 222 and the middle sprocket 226. Since the shift pins 268 lock the bottom sprocket 246 to the middle sprocket 226, turning the steering bar 70 rotates the bottom sprocket which drives the crab chain, causing both front wheels to steer to the same angle. At the same time, the right rear sprocket 106 is also steered to the same angle as the front wheels via the middle sprocket driving the right chain 284. Similarly, the top sprocket 190 is rotated along with the middle sprocket 226 via the connection between them formed by the pivoting arms 196 and 228 and the pin 206. The top sprocket drives the left chain 282 and the left rear sprocket 104 also to the same steering angle, so that all four wheel sets are steered to the same angle.

For corrective steering, the shift lever 258 is rotated to move the fork ring 266 into the down position. The fork ring 266 and the bottom sprocket 246 are locked against rotation via the lock pins 270 engaged into holes in the bottom plate 82 or other fixed structure. This locks the front wheel sets into the straight ahead position. Turning the steering bar 70 turns the axle 222 which drives the middle sprocket 220, causing the right rear sprocket 106 and the right rear wheel sets to a first steering angle. The top sprocket 190 is driven through the differential 200 to a corrected steering angle via the roller 208 moving in the roller slot 244. The left rear sprocket 104 and the left rear wheel sets are consequently steered to a corrected steering angle. The base 50 therefore achieves corrected steering so that the wheels track precisely with little or no slipping or skidding as the base moves in a curved path.

The base 50 may also be steered by inserting the steering bar 70 into the riser 108 or any one of the four leg assemblies 96. This allows the operator to steer the base 50 from any one of five different positions. The steering bar 70 is very quickly and easily inserted and removed since no screw thread or other fittings are used. Rather the steering bar 70 is simply inserted and turned to engage the keyway. The shift lever 258 may also have a third position where the axle 222 is locked out against rotation, thereby locking all of the wheels at a fixed steering angle, typically at the straight ahead steering angle.

The steering system 52 is disengaged when the operator wants to use the base 50 as a caster mode dolly, which is simply pushed and not steered. The cam locks 120 are released or unlocked, by lifting the levers 156, allowing the leg assembly 96 to rotate independently of the sprocket 102, 104 or 106. The thumb screw 140 on each leg assembly 96 is loosened. The axle frame 124 is turned ½ turn, from the normal position shown in FIGS. 6 and 7 to the caster or offset position shown in FIGS. 8 and 9. The thumb screws 140 are retightened. The wheels then act as caster wheels, allowing the base 50 to be pushed in any direction. The offset of the wheel axles 130 from the riser 108 is shown as dimension CC in FIG. 6, with dimension CC typically ranging from about ¾ to 1¼ inches. The dolly may optionally be temporarily lifted up off of the ground to un-weight the leg assemblies, to make it easier to rotate the axle frames 124 when configuring the dolly for caster movement.

The base 50 may be compact and lightweight, so that it may be used in confined spaces and be easily lifted and carried by one or two people. For example, in one design the base has a width and length of about 20 inches and weighs about 40 pounds. The base 50 may also be designed so the wheel sets are spaced apart by 16 inches, to allow the base to operate on narrow track. As shown in FIG. 1, the camera 36 may be positioned on the column with the lens 38 aligned with an axis AA passing through the front wheels. Alternatively the camera 36 may be positioned so that the center of the camera coincides with the center of rotation of the base 50 during corrective steering.

Although chains and sprockets are shown and described, they may of course be replaced by belts and pulleys, and especially tooth belts. As used here, reference to chains and sprockets includes belts and pulleys. The specific design of the disk 126 rotatable within the cup 110 to achieve caster offset is provided as an example. Caster offset may alternatively be achieved in other ways using cams, linear tracks, arms similar to arm 128 but having a pivotable joint, arms 128 having dual sets of axles, one set for steering and one for caster operation, etc. These are collectively referred to here as a caster fitting, i.e., a component that allows switching between normal and caster positions. The claims below encompass these alternatives as well. The terms sprocket and chain in the claims include use of pulleys and belts. The terms rotatable and rotatably refer to turning movement, which may be greater than or less than 360 degree movement. The steering transmission 100 may be replaced with various other types of steering transmissions, for example as described in U.S. Pat. No. 6,520,642, or steering transmissions providing similar steering functions using gears, cams, levers, or other elements.

Figure 27:
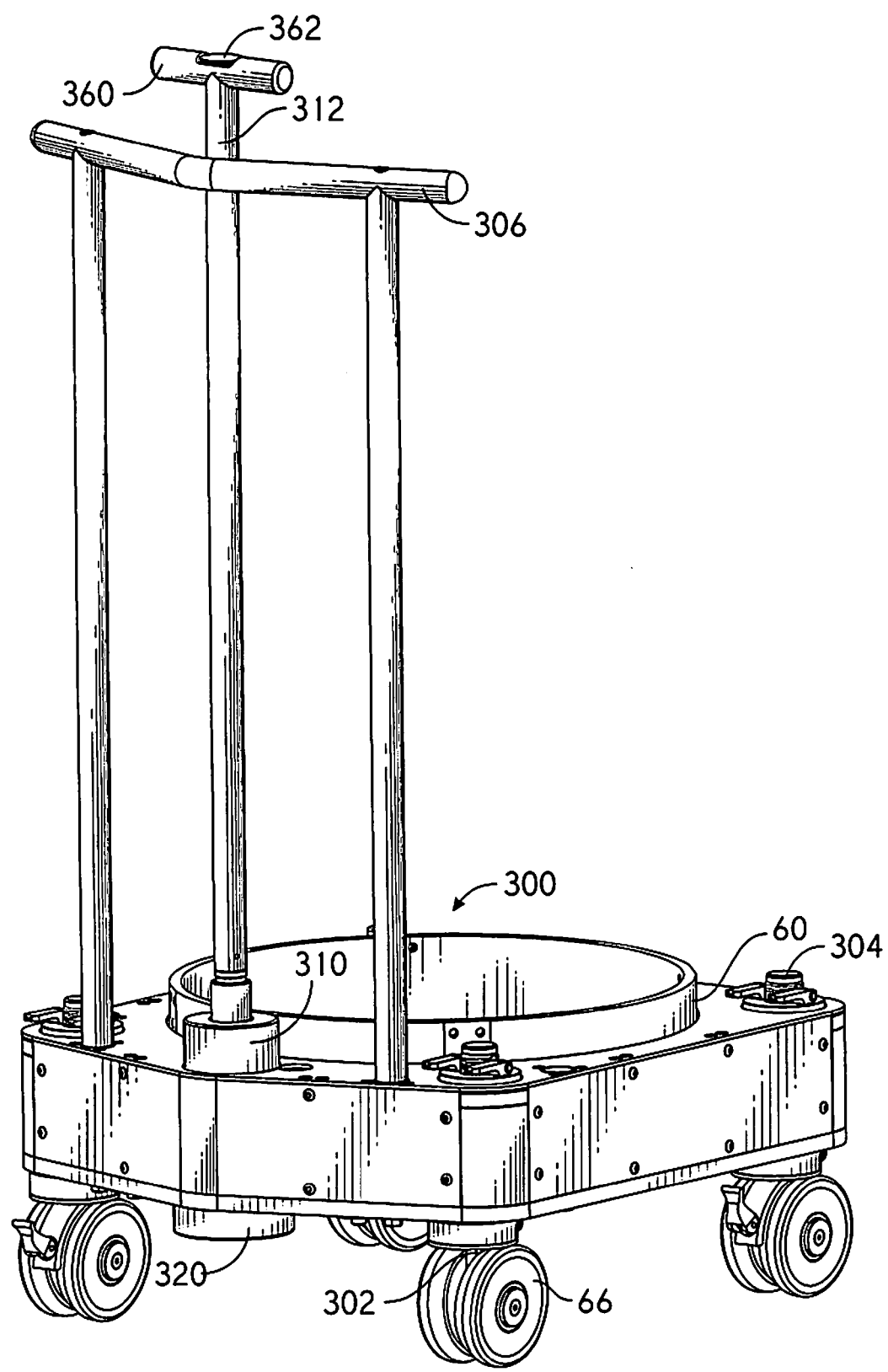
FIG. 27 is a perspective view of an alternative dolly design.
Figure 28:
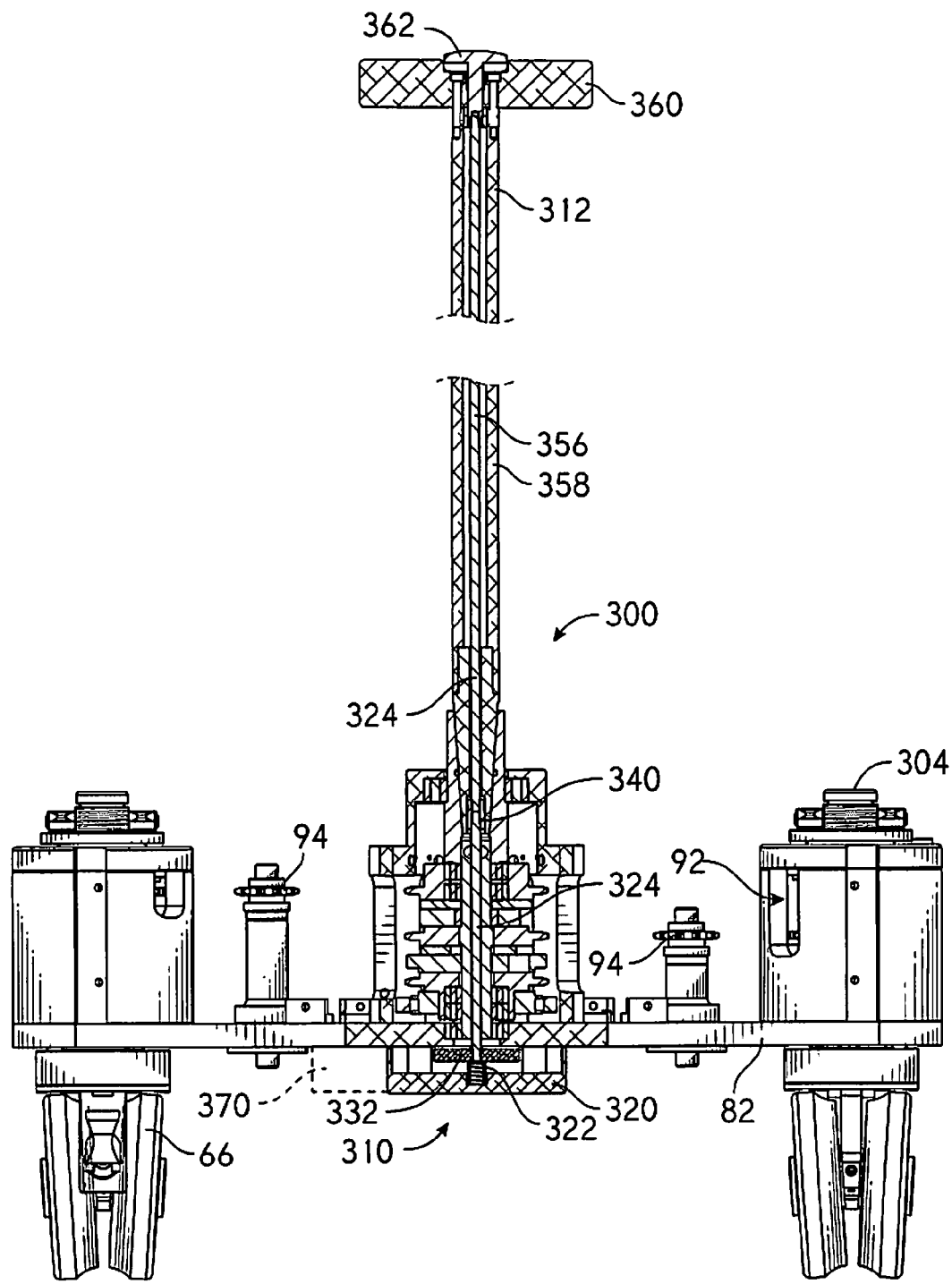
FIG. 28 is a partial section view of the steering handle and transmission of the dolly shown in FIG. 27.
Figure 29:
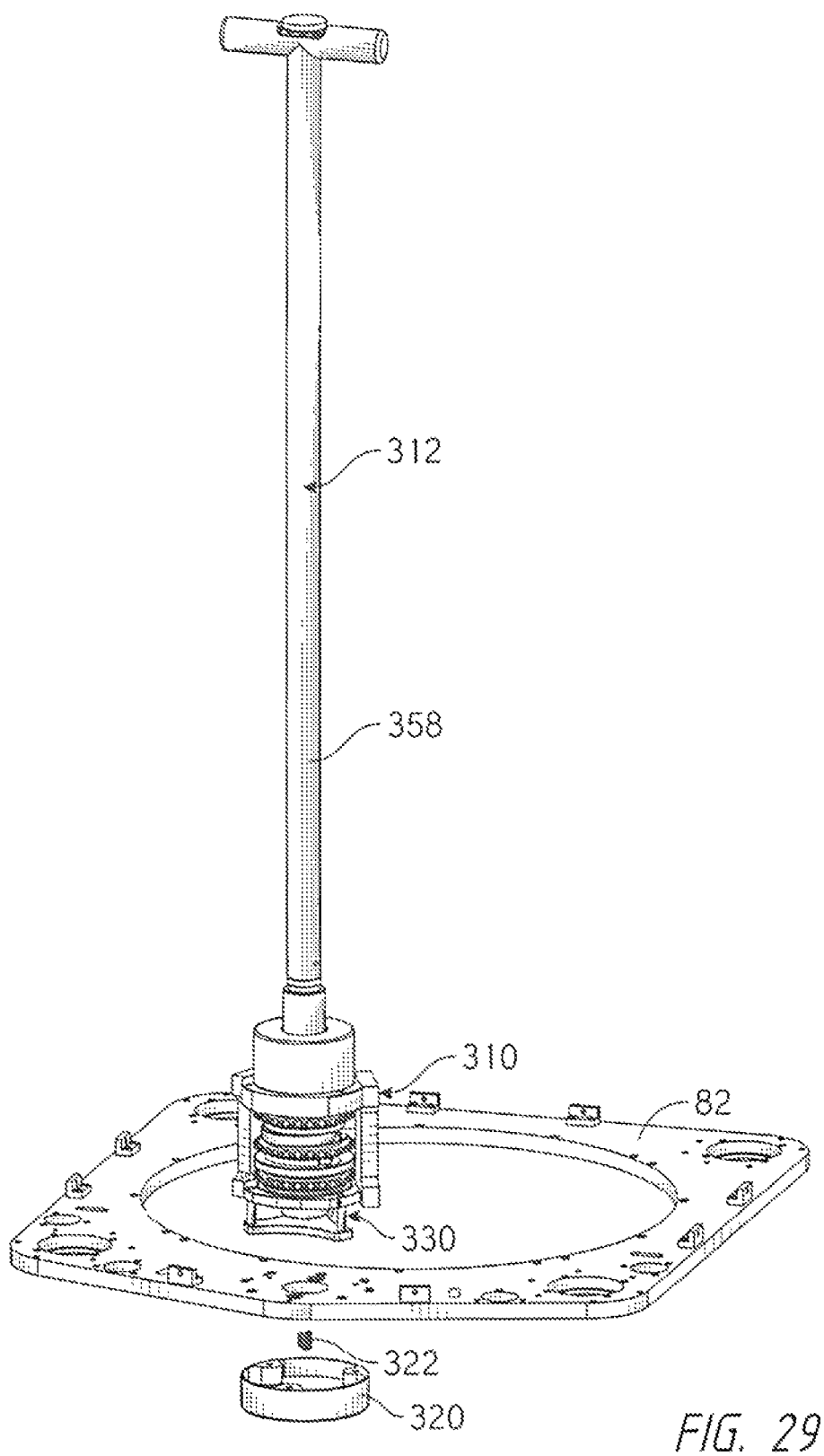
FIG. 29 is a perspective view of the steering transmission of the dolly shown in FIGS. 27-28.

FIGS. 27-31 show another embodiment 300 having a steering transmission 310 shiftable between crab and corrective steering modes using an alternative handle 312. The caster wheel elements shown in FIGS. 5-9 may be omitted in the dolly 300 shown in FIGS. 27-32. They may also be omitted in the dolly 30 shown in FIGS. 1-2. Where either dolly 30 or 300 does not include the caster wheel elements, a straight kingpin 302 as shown in FIG. 27 may be used at each corner of the dolly 30 or 300. In this case, referring to FIG. 6, the arm 128 is permanently axially aligned with the riser 108, and the cup 110, disk 126 and thumbscrew may be omitted. Either dolly 30 and 300 may also be provided with a push bar 306, and with risers 108 or kingpins having a capped or closed off top 304, as shown in FIGS. 27-28.

Camera dollies are ordinary used primarily in crab steering mode, as this allows the camera to be moved and positioned as desired, without angulating the lens, i.e., crab movement does not change the azimuth angle of the lens. Generally, with camera dollies, corrective steering is used only as needed to turn a corner, or for dolly alignment. This occasional use tends to be brief, with dolly operator retuning to crab steering mode after brief and intermittent use of corrective steering mode. The dolly 300 allows for improved filming or video recording by simplifying shifting between steering modes. Via use of a spring, solenoid or other actuator, an axial force may be maintained on the steering transmission components that effect steering mode shifting, to hold the steering transmission into a first (typically crab mode) steering mode. The user may shift the steering transmission into a second steering mode (typically corrective mode) by pressing on a plunger on a steering handle on the dolly, or via an equivalent movement such as turning, twisting or pulling on a component linked to the steering transmission.

Figure 30:
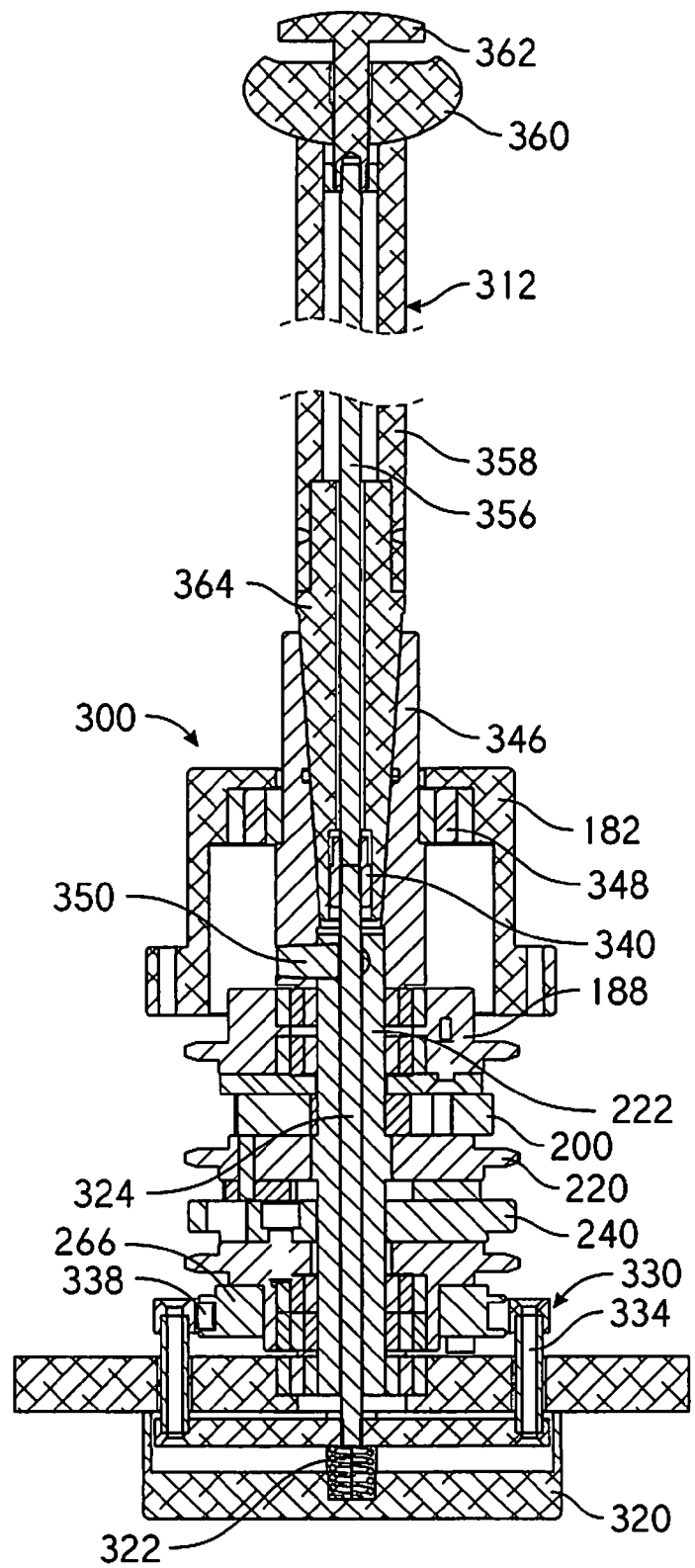
FIG. 30 is an enlarge section view of the steering handle and steering transmission shown in FIG. 28.
Figure 31:
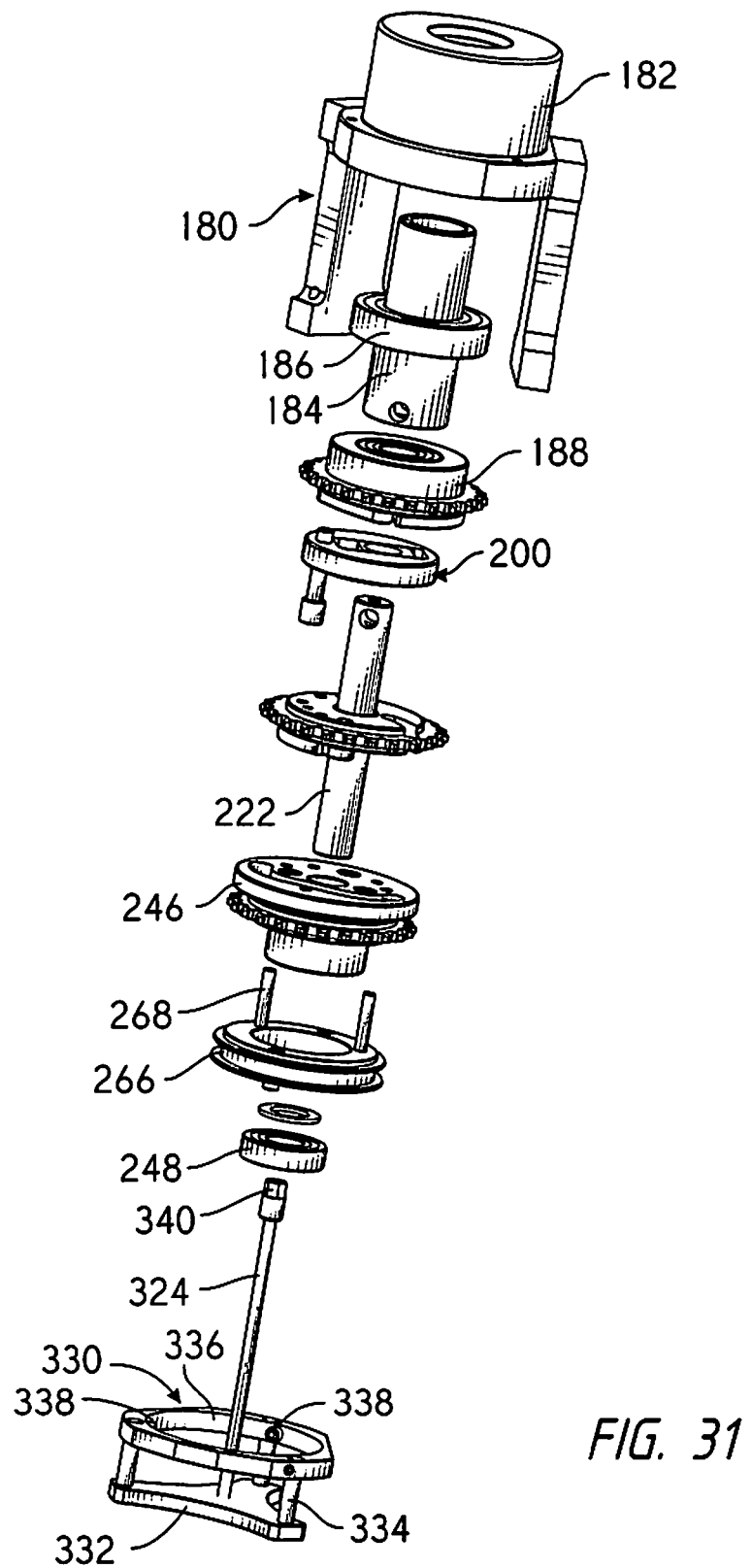
FIG. 31 is an exploded perspective view of the steering transmission shown in FIGS. 28-30.

In the example of this concept shown in FIGS. 28-31, the dolly 300 has a spring 322 which may be supported on a cover 320 attached to a bottom surface of the bottom plate 82. Specifically, as shown in FIG. 31, a shift frame 330 has a spring plate 332 connected to a roller ring 336 by posts 334. The spring 322 pushes up on a spring plate 332. Comparing FIG. 31 with FIG. 14, in the dolly 300 the shift frame 330 may be used in place of the shift fork 250 and shift lever 258. As shown in FIG. 31, rollers 338 on the roller ring 336 may be positioned to roll within the channel or slot of the fork ring 266.

A spring rod 324 may extend up through the sprocket assemblies 240, 220 and 188 of the steering transmission 310, with the lower end of the spring rod 324 attached to the spring plate 332 of the shift frame 330. The spring 322 constantly exerts an upward force on the shift frame 330 and on the shift rod 324.

Referring to FIGS. 28 and 30, the handle 312 has a handle bar 360 attached onto the top end of a hollow handle tube 358. The lower end of a shift rod 356 within the handle tube is attachable to the spring rod 324 optionally via a threaded coupler 340. The upper end of the shift rod 356 is attached to a plunger 362 extending through the handle bar 360. In the example shown the plunger 362 is permanently attached to the upper end of the shift rod via screw threads. However, the plunger 362 may alternatively rest on top of the shift rod, with the plunger 362 optionally separable from the shift rod. A cone 364 on the lower end of the handle tube 358 may be configured to engage into a complimentary receiver 346 rotatably supported on a bearing 348 within the transmission housing 182. The receiver 346 may be attached to the axle 222 via a pin 350.

In use, during steering the dolly 300 operates in the same way as the dolly 30. The handle 312 is inserted into the steering transmission 310 with the cone 364 engaging into the receiver 346, and with a key 72 on the cone engaging a keyway 122 in the receiver, or vice versa. The lower end of the shift rod 356 may then be threaded into the coupler 340 by turning the plunger 362. In some designs, the coupler 340 and this step may be omitted, so that the lower end of the shift rod 356 simply rests on top of the spring rod 324. Turning the handle bar 360 turns the handle tube 358 and the cone 364. With the handle 312 installed, turning the handle bar 360 turns the axle 222, with the steering transmission 310 providing the same steering functions as the steering transmission 100.

Since the spring 322 constantly exerts an upward force on the shift frame 330, the steering transmission 310 is automatically constantly maintained in the crab steering mode. The dolly 300 is shifted into corrective steering mode via the operator pressing down on the plunger 362, when the steering system is at the zero or 180 degree position. The downward movement of the plunger 362 moves the shift rod 356, the spring rod 324 and the shift frame 330 down, against the upward force of the spring 322. These elements shift vertically but do not rotate. The rollers 338 on the shift frame 330 pull the fork ring 266 down, shifting the transmission into corrective steering mode. As described above relative to the dolly 30, the fork ring 266 moves up or down during shifting and rotates with the bottom sprocket assembly.

The dolly 300 will remain in the corrective steering mode while the dolly operator holds the plunger 362 down. When the dolly operator releases the plunger 362, the dolly 300 automatically shifts back to the crab steering mode when the steering system is turned to the zero or 180 degree positions, i.e., when the wheels are straight and the angular orientations of the shift pins 268 align with shift pin holes in the sprocket assemblies.

The spring 322 may be selected to exert an upward force on the spring rod 324 that is only nominally higher than the combined weight (about 1 kg or 2 lbs.) of the vertically moving components of the steering transmission 310. This allows the plunger to be pressed down using a very light touch. The dolly operator can then hold the steering system in the corrective mode with minimal hand effort. In some designs the receiver 346 may be provided with a split collar and a locking bolt, or similar clamping mechanism, to positively clamp or lock the handle 312 onto the dolly 300, if desired. The geometric steering angle correction provided by the differential may optionally be provided by a cam and/or lever design, without using the differential shown in the drawing.

As shown in FIG. 28, the spring 322 may be replaced with, or supplemented by, a solenoid 370 positioned to drive the spring rod up or down. This allows the dolly to be shifted between steering modes via a switch instead of via the plunger. The switch, which may be located on the handle bar 360, may be electrically or wirelessly linked to the solenoid 370. As the solenoid 370 is ordinarily used only intermittently, it may be powered by a relatively compact battery. Use of the solenoid also allows the dolly to remain in either steering mode without the operator holding the plunger down, or taking any other action. Except as described above, the dolly 300 may have the same design and operation as the dolly 30.

Turning to FIGS. 32-35, the dolly may be provided with an adjustable height handle 374. The handle 374 may include a handle block 384 attached to the top end of an outer tube 376, with a handle bar 386 on the handle block 384. The bottom end of the outer tube 376 may be provided with longitudinal slots 380 forming tabs 408, with external threads provided above the slots 380. A lower tube 404 can telescopically slide within the outer tube 376. A key 382 on the outer tube may extend into a key slot 406 in the lower tube 404, so that tubes 376 and 406 necessarily rotate together. A hand nut 400 may be captive on the lower tube 404 and positioned to screw onto the threads 378 on the outer tube 376.

Figure 32:
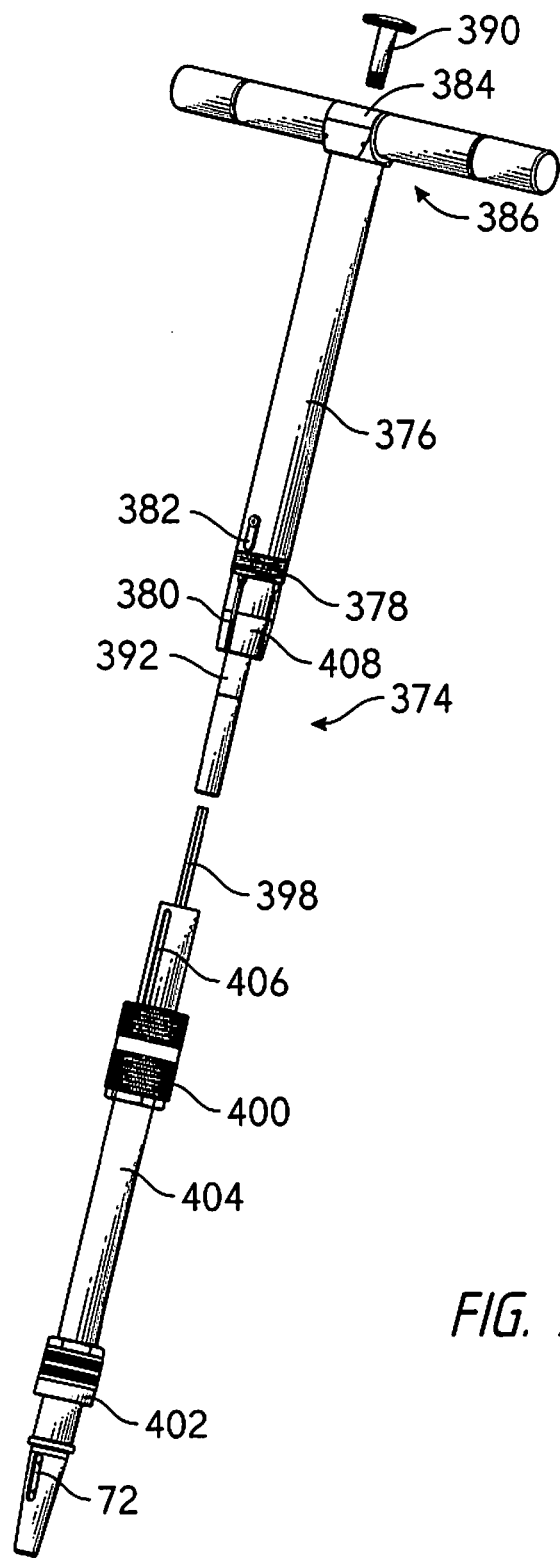
FIG. 32 is an exploded perspective view of an alternative handle which may be used with the dolly shown in FIGS. 1-31.
Figure 33:
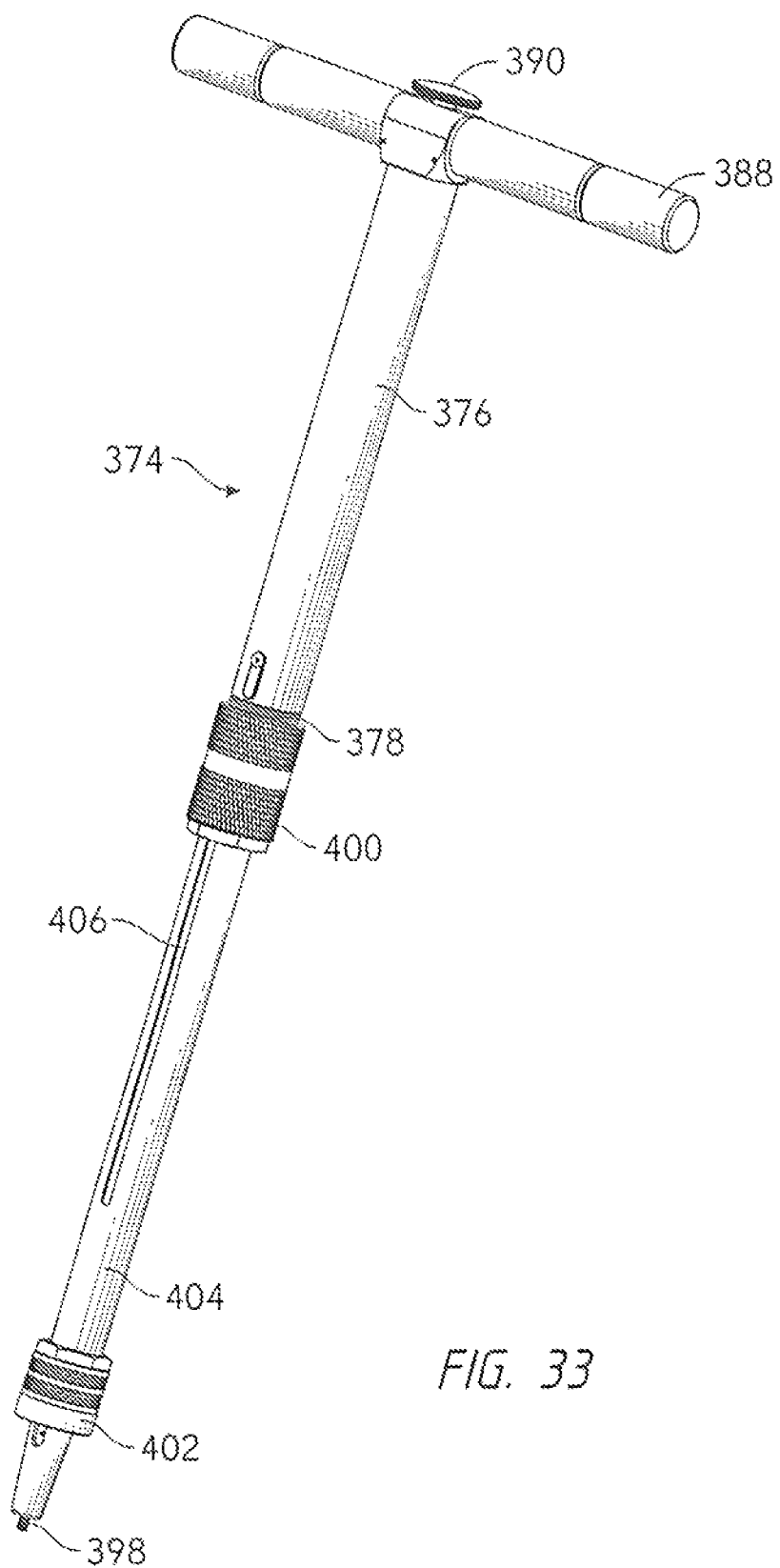
FIG. 33 is an assembled perspective view of the handle shown in FIG. 32.
Figure 35:
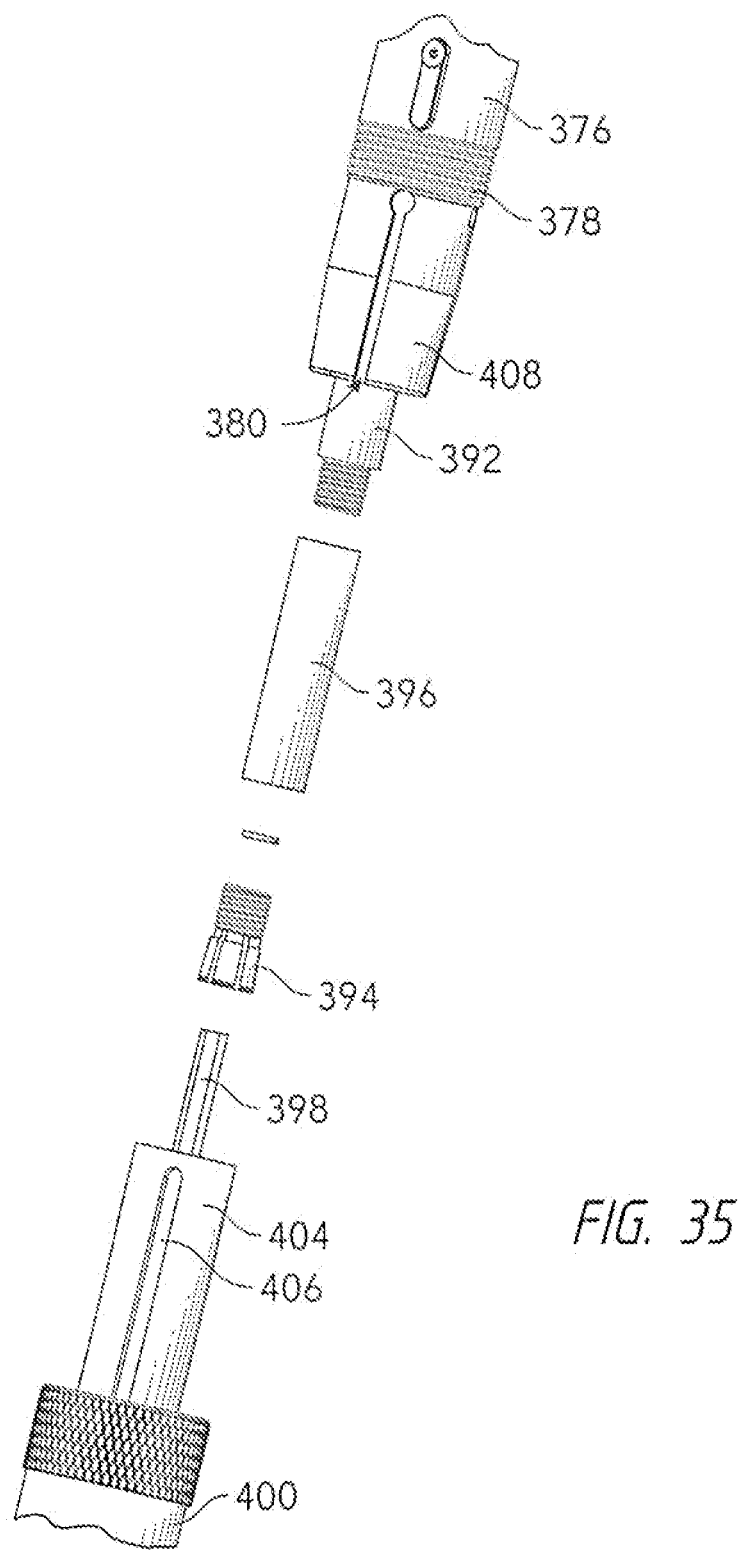
FIG. 35 is an enlarged perspective view of internal components of the handle shown in FIGS. 32 and 33.

As shown in FIGS. 32 and 35, a plunger 390 is rigidly attached onto the upper end of an inner tube 392, and a split collet 394 is attached to a lower end of the inner tube 392. The inner tube 392 extends through a turnbuckle sleeve 396 positioned above the split collet 394. The sleeve 396 has a left hand thread at one end and a right hand thread at the other end, so that turning the inner tube 392 causes the collet 394 to move into or out of the sleeve 396. The spring rod 324 and the shift rod 356 shown in FIG. 28 are replaced with a hexagonal (or other geometric shape) shift rod 398 that cannot rotate within the collet 394. The cap 182 of the transmission housing shown in FIG. 31 may be threaded, with the handle 374 then attached via a threaded collar 402 captive on the lower tube 404.

In use, the height of the handle 374 may be adjusted by loosening the hand nut 400 to allow the outer tube 376 to slide up or down over the lower tube. The shift rod 398 must stay connected to the plunger 390 to allow for shifting of the steering transmission, regardless of the handle height adjustment. This is achieved via operation of the collet 394. As shown in FIGS. 32 and 35, turning the plunger counter clockwise pushes the collet 394 out of the sleeve 394, allowing the fingers of the collet to flare outwardly sufficiently to allow the collet 394 to slide over the shift rod 398. With the hand nut 400 loosened, the outer tube 376 may be telescopically pulled up or pushed down to position the handle 386 at a desired height. The loosened collet 394 correspondingly slides up or down on the shift rod 398.

With the handle 386 at the desired height, the hand nut 400 is tightened causing the tabs 408 to clamp inwardly onto the lower tube 404, locking the handle 386 in a fixed vertical position. The plunger 390 is rotated clockwise drawing the collet 394 into the sleeve 396 causing the collet fingers to clamp inwardly onto the shift rod 398. The shift rod is then rigidly reconnected to the plunger, allowing the plunger to operate as described above, regardless of the adjusted height of the handle bar. Although the collet and shift rod may have a round cross section, a hexagonal or other polygon shape may provide a more secure attachment between them.

Figure 34:
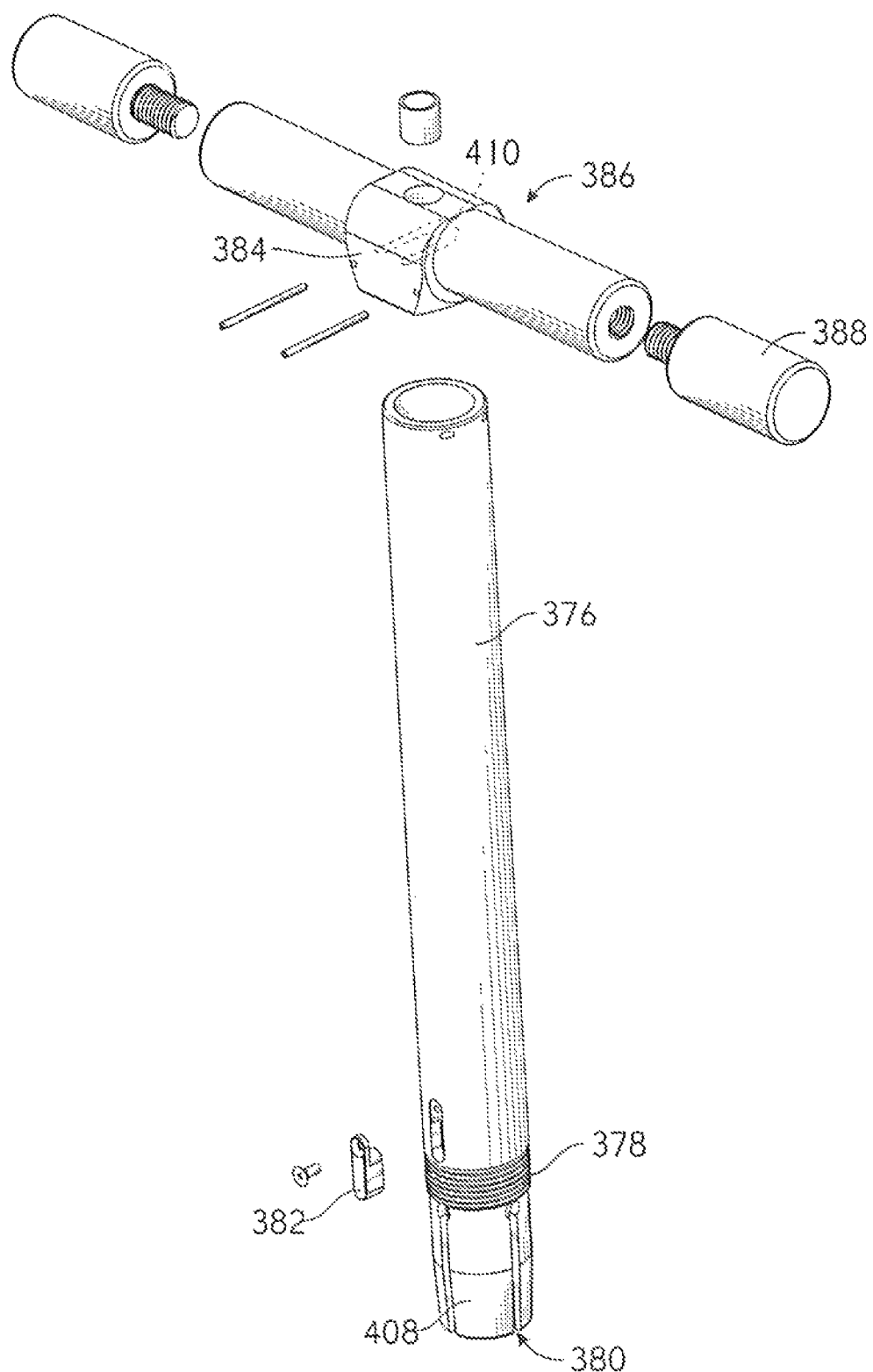
FIG. 34 an enlarged perspective view of components of the handle shown in FIGS. 32 and 33.

As shown in FIG. 34, in an alternative design, the plunger 390 may be replaced with a handle as shown for example in U.S. Pat. No. 6,520,642, where twisting the handle bar positively drives the inner tube 392 up or down to effect shifting. In this design, a rack and pinion mechanism may be used to convert the rotary movement of the handle bar into linear movement of the inner tube. Since the shift rod need only move about 10 mm to effect shifting, a shift fork 410 in the handle block 384 may be pivotally attached to the top end of the inner tube 392 to similarly allow rotary movement of the handle bar to shift the steering transmission.

Figure 36:
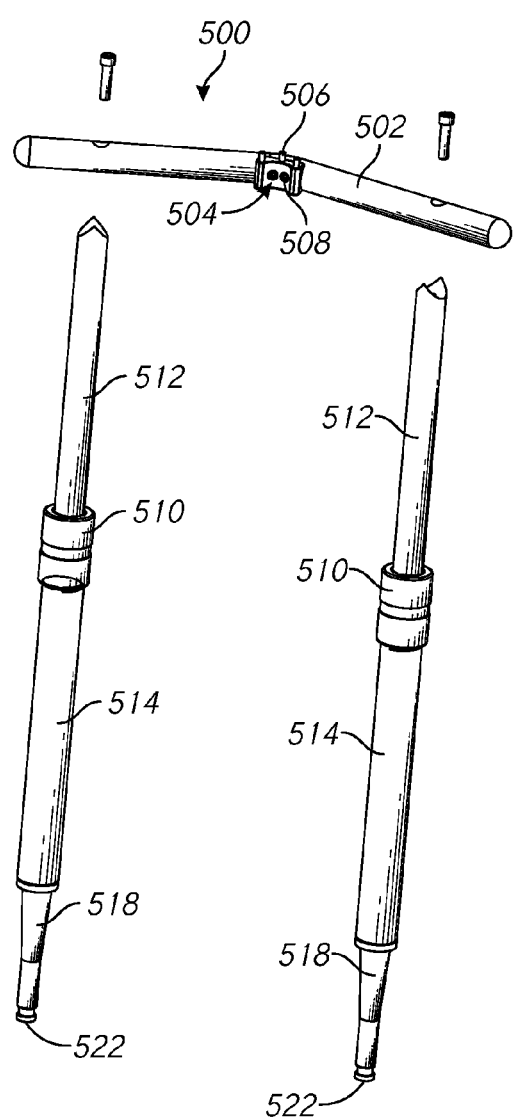
FIG. 36 is an exploded perspective view of a tracking or push bar.

FIG. 36 shows an alternative push or tracking bar 500 which is similar to the push bar 306 shown in FIG. 27, but with the push bar 500 having adjustable height. The push bar 500 may include a slightly V-shaped horizontal arm 502 having a pin fitting 504 at the center or apex. Referring also to FIG. 37, the pin fitting 504 has upwardly projecting pins 506 and a recess 508 having a curvature matching a steering bar 530, shown in FIG. 39, adapted to be used with the push bar 500. A pair of legs is attached to the arm 502, with each leg having an upper segment 512 telescopically inserted into or over a lower segment 514. The lower segment 514 may include tabs and slots, similar to the steering bar shown in FIG. 32. The height of the handle bar arm 502 may be adjusted by loosening the locking collars 510, moving the arm 502 to the desired height, and then re-tightening the locking collars 510, similar to the operation of the locking collar 400 as described above relative to FIG. 32. The lower end of each leg of the push bar 500 may include a tapered conical section 518 and a head 522, as shown in FIG. 36.

Figure 39:
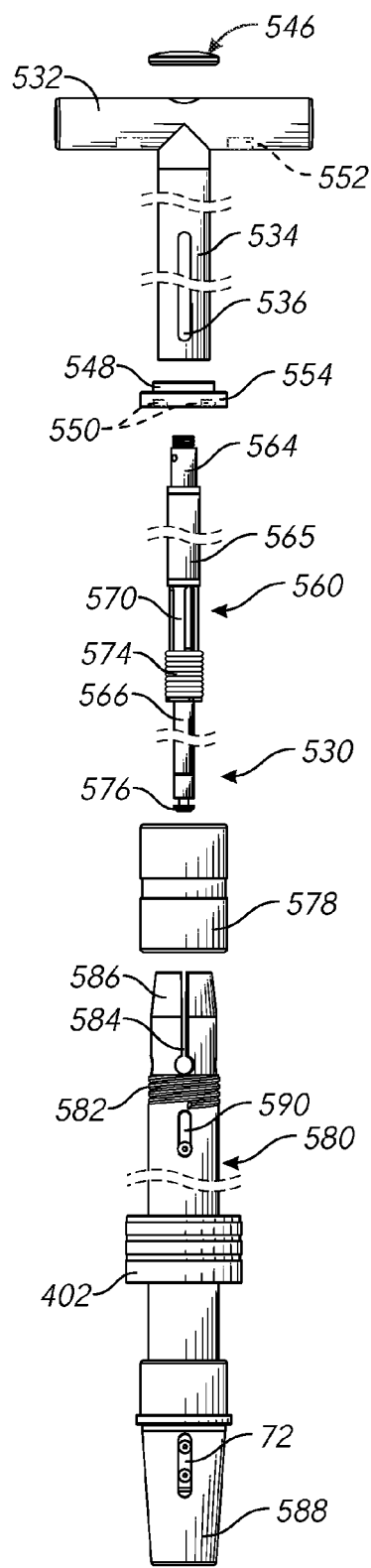
FIG. 39 is an exploded side view of the steering handle shown in FIG. 38.
Figures 40, 41, 42:
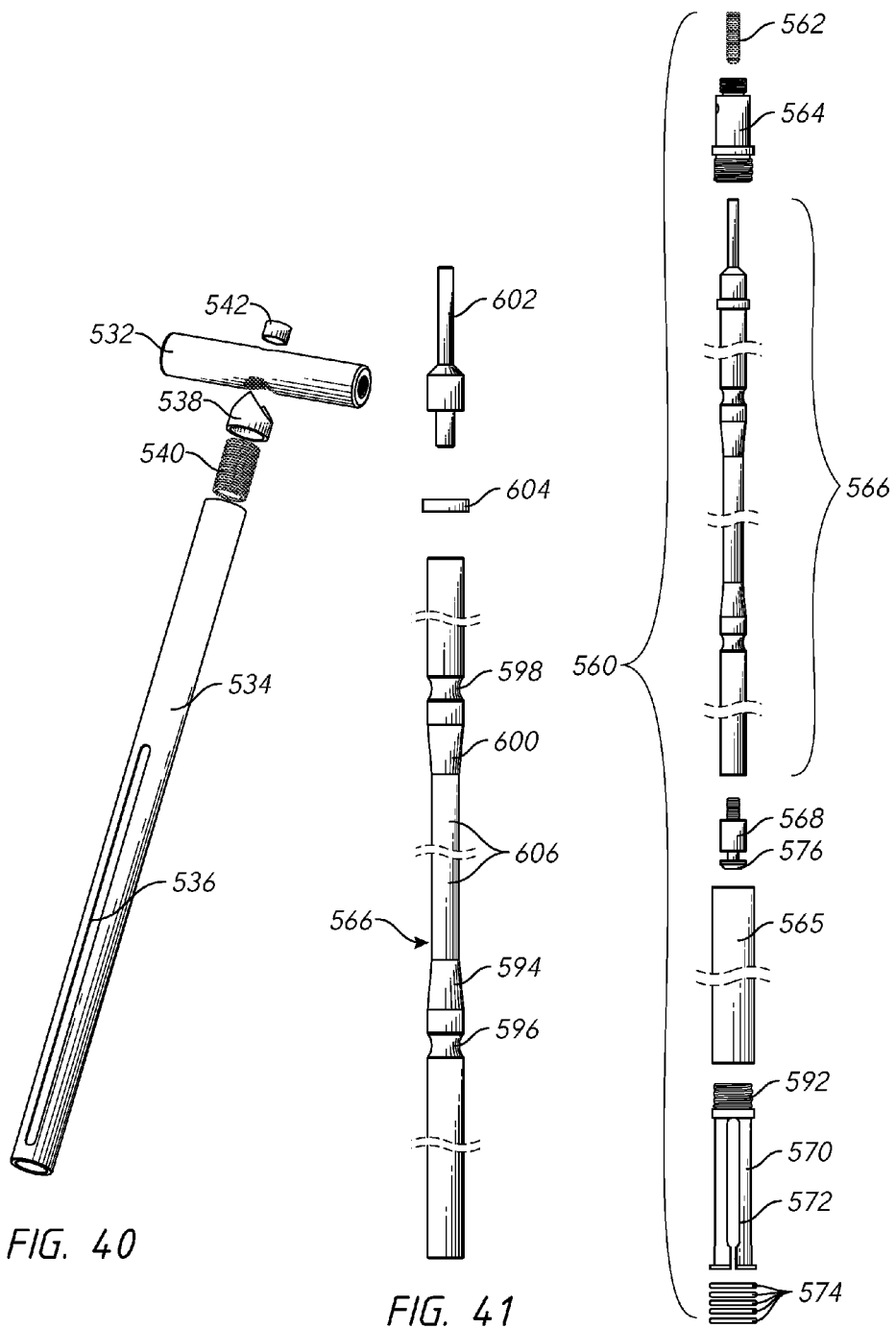
FIG. 40 is a perspective view of components of the steering handle shown in FIGS. 39 and 40.
FIG. 41 is a side view of the shift rod shown in FIG. 39.
FIG. 42 is an exploded side view of the shift rod assembly shown in FIG. 39.

Turning to FIGS. 38 and 39, an adjustable height steering handle 530 has a horizontal handle bar 532 attached to a slot tube 534. FIG. 40 shows one example of this attachment using a stud 540 threaded into an upper end of the slot tube 534, with the stud 540 also threaded into a fitting 538 joined to the handle bar 532, and an insert 542 secured within the handle bar 532. A slot 536 in one side of the slot tube 534 extends up from the lower end of the slot tube to an intermediate position on the slot tube 534.

Referring still to FIG. 39, the lower end of the slot tube 534 fits into the upper end of a base tube 580, with a key 590 on the base tube projecting into the slot 536 of the slot tube 534. The key 590 rotationally locks the slot tube 534 to the base tube 580, while allowing the slot tube 534 to telescopically slide axially or vertically relative to the base tube. The upper end of the base tube 580 may have slots 584 forming tabs 586, similar to the slots and tabs shown in FIG. 32. A collar 578 around the slot tube 534 having a tapered inner surface may be threaded onto screw threads 582 on the base tube 580. Tightening the collar 578 forces the tabs radially inwardly to clamp onto the slot tube to prevent axial movement between the slot tube 534 and the base tube 580, to fix the handle bar 532 at a desired height. The lower end 588 of the base tube 580 may have a conical taper and a key 72 to fit into a receiver 346 of the steering transmission 310. The keys 72 and 590 may be provided in different forms, or they may be replaced by similar anti-rotation devices such as clamps, pins, cams, etc.

As shown in FIG. 39, a shift rod assembly 560 is contained within the slot tube 534 and the base tube 580. Referring also to FIGS. 41 and 42, a shift cap 546 on top of the handle bar 532 is attached onto the threaded upper end of a connector 564 projecting through the insert 542. A set screw 562 may be threaded into the connector 564 for factory calibration. A clamp tube 565 is threaded onto the lower end of the connector 564. A support ring 554 is positioned on the slot tube 534 above the collar 578, as shown in FIG. 38, with the support ring 554 having one or more magnets 548 and a pattern of holes 550 on the bottom surface of the support ring 554 matching the size and pattern of the pins 506 on the pin fitting 504. One or more magnets 552 may also be provided on the lower surface of the handle bar 532. If used, the magnets hold the support ring 554 at the top end of the slot tube 534, adjacent to the handle bar 532.

Referring once again to FIGS. 42 and 43, the shift rod assembly 560 may include a plunger 602 and a centering ring 604 at the upper end of a shift rod 566. The shift cap is attached to the stud 562 which may rest on top of the plunger 602, without being attached to the plunger 602. The shift rod 566 extends through the clamp tube 565. A rod insert 568 having a head 576 may be attached onto the lower end of the shift rod 566. The plunger and/or the head may of course alternatively be formed directly on or made part of the shift rod. The head 576 may be the same as the heads 522 on the push bar 500.

A clamp 570 is attached to the lower end of the clamp tube 565. The clamp has fingers 572 which can flex in or out radially. A group of elastic bands or O-rings 574 are positioned around the fingers to bias the fingers 572 inwardly, causing the fingers to squeeze down onto the shift rod 566. The shift rod 566 may have a relatively long central section 606 having a uniform diameter, and a lower ramp section 594 flaring outwardly to a lower groove 596, and a mirror image upper ramp section 600 flaring outwardly to an upper groove 598, as shown in FIG. 41.

As shown in FIGS. 43-45, a slide lock 612 may be provided on the bottom surface of the spring plate 332 of the shift frame 330. As shown in FIG. 44, the slide lock 612 may have a slot plate 614 having a semi-circular slot at one end and a finger tab 616 at the other end, with the finger tab 616 perpendicular to the slot plate. The slide lock 612 is held onto the spring plate 332 via a bracket 618. Referring momentarily to FIG. 38, a cutout or window may be provided in the cover 320 to provide clearance for the slide lock 612. As shown in FIG. 45, slide locks 612 may similarly be provided on the underside of the bottom plate 82 in alignment with an opening through push bar receiving tubes 620.

Referring to FIGS. 27 and 36, the push bar 500 may be quickly installed onto the dolly 300 by inserting the lower segments 514 into the receiver tubes 620 on the chassis. The receiver tubes may have an internal conically tapered surface complementary to the tapered surfaces 518 on the legs of the push bar 500. As shown in FIG. 45, after the legs are fully seated, the head 522 of each leg is positioned below the bottom plate 82. The slide locks 612 are then pushed inwardly with the slot plates engaging the heads 522, to prevent the legs from being pulled out from the receiver tubes 620. Since the legs cannot be pulled out without withdrawing the slide locks, the push bar 500 may also be used to lift and carry the dolly 300. The height of the bar 502 may be adjusted by loosening the locking collars 510, raising or lowering the bar 502, and then retightening the locking collars. Thus, the push bar 500 may be quickly installed, adjusted to a desired height, and removed, without using tools. The push bar 500 also eliminates the need for providing the dolly 300 with multiple push bars having different heights. The push bar 500 may be used with or without the steering handle 530.

Turning to FIGS. 38, 39 and 43, the steering handle 530 is installed by placing the tapered end 588 into the receiver 346 of the transmission as discussed above relative to FIG. 30. The head 576 of the shift rod 566 extends below the spring plate 332 and is engaged by moving the slide lock 612 inwardly. Referring to FIG. 43, this locks the shift rod together with the spring plate 332. The steering handle 530 therefore cannot be inadvertently pulled out of the receiver 346.

The upper end of the slot tube 534 fits within the recess 508 in the pin fitting 504 fixed to the bar 502. The magnets 548 and 552 hold the support ring 554 up above the pins 506. The steering handle 530 may be temporarily attached to and supported by the push bar by pushing the support ring 554 down onto the pin fitting, with the pins 506 moving into the holes in the bottom of the support ring. This allows the user to push firmly on the steering handle 530 with minimal deflection of the steering handle. The user can then securely steer and push the dolly using only the steering handle, if desired.

The shift rod 566 is in the up position and the transmission 300 is by default in the crab steering mode via the transmission spring 332 as described above. Turning the bar 502 about the vertical central axis of the slot tube correspondingly turns the slot tube 534 and the base tube 580 which is keyed to the slot tube, which turns the receiver 346 to steer the dolly 300. The shift rod 566 and the shift cap 546 may remain fixed in place and need not move during steering.

To shift from crab to corrective steering mode, the user presses down on the shift cap 546. This movement also presses the shift rod 566 down, shifting the steering transmission into the corrective mode steering. The steering system will then remain in the corrective steering mode for as long as the user continues to press down on the shift cap 546, or for as long as the steering system remains out of the zero or 180 degree wheel angle position. If the user releases the shift cap 546, the transmission spring 582 will push the shift rod 566 back up and the transmission will return to the crab steering mode, once the dolly wheels are steered to a zero or 180 degree position.

The height of the steering handle 530 may be adjusted by loosening the collar 578 and sliding the slot tube 534 further into and out of the base tube 580, and then retightening the handle. As this occurs however, the effective length of the shift rod 566 must also change to allow steering mode shifting at any handle height, while the actual length of the shift rod 566 is of course fixed. To maintain the ability to shift between steering modes with the handle bar 532 at any height, the clamp 570 is adapted to grip the shift rod 566 at any position within its range of travel. The shift cap 546, the connector 564, the clamp tube 565 and the clamp 570 are attached to each other and move as single assembly when the shift cap 546 is pressed down or released from the down position.

As the handle bar 532 is pulled up for example to raise the handle bar height, the clamp moves up with the handle bar, with the fingers 572 sliding over the shift rod 566. Regardless of the height selected, the clamp squeezes on the shift rod 566 with sufficient force to transmit vertical shift movement of the shift cap 546 to the shift rod 566. Pressing or releasing the shift cap 546 therefore shifts the steering transmission with the handle bar 532 at any height. The number, size and type of elastic or O-rings 574 used may be varied to allow the clamp 570 to operate as described above, without also creating excessive resistance to raising or lowering the handle bar 532. The clamp 570 may be replaced by similar devices providing sufficient clamping force on the shift rod 566 to allow shifting at any handle bar height position, including spring and friction types of devices. Although the shift cap 546 is shown as a round disk, it may be replaced by equivalent shift actuators, such as a bar or a lever. The shift cap 546 in whichever form selected, may also be relocated to a position at one or both sides of the handle bar 532, or to a position on the slot tube below the handle bar.

The lower and upper grooves 596 and 598 shown in FIGS. 41 and 42 provide detent positions corresponding to a full up and a full down handle bar position. As the user moves the handle bar into either the full up or full down position, the groove provides a tactile indication that a stop position has been reached, as the fingers 572 move radially inwardly into the groove 596 or 598. The groove also provides increased holding force since the fingers must be moved radially outwardly against the tension of the O-rings 574 before the handle bar 532 can be moved out of the full up or full down position. As the central section 606 of the shift rod 566 has a smaller diameter than the ends, the clamp 570 slides over the central section 606 with less clamping force than at the ramps 594 and 600. The increased resistance to movement at the ends of the range of travel of the handle bar helps to provide smoother movement. Additional grooves and ramps may provide at intermediate positions along the length of the shift rod to provide intermediate detent positions, if desired.

Engageable as used here means movable into contact or engagement with an element or assembly to perform a function, and also removable from that element, for example as for temporary use to achieve a specific dolly movement or similar function. Attached or attached to means mechanically connected directly or indirectly through one or more intervening elements. In sliding engagement with, relative to the shift rod, means engaged with sufficient force (about 4-25 N or 1-6 lbf) so that actuation of the shift cap 546 shifts the transmission, while also allowing for telescoping movement of the slot tube with a force not greater than about 45, 90 or 135 N (10, 20 or 30 lbf).

Thus, a novel camera dolly has been shown and described. Various changes and modifications may of course be made without departing from the spirit and scope of the invention. The invention, therefore, should not be limited, except by the following claims and their equivalents.

The invention claimed is:

1. A camera dolly comprising:
a chassis having four steerable wheel sets;
a steering transmission in the chassis having at least two steering modes;
chains or belts linking each wheel set to the steering transmission; and
a steering bar engageable with and removable from the steering transmission and including a handle attached to an upper end of a slot tube, with the slot tube telescopically slidable into or over a base tube, with the slot tube not rotatable relative to the base tube, a shift rod having an upper end connected to a shift cap at the steering bar and a lower end connectable to the steering transmission; and a clamp clamping onto the shift rod and axially movable with the handle bar, to allow shifting steering modes via movement of the shift cap, with the steering bar at any selected height.

2. The camera dolly of claim 1 with the shift rod having upper and lower grooves providing maximum and minimum steering bar height positions.

3. The camera dolly of claim 1 with the clamp attached to a clamp tube within the slot tube, and the shift rod extending through the clamp tube.

4. The camera dolly of claim 3 with the clamp having fingers biased radially inwardly onto the shift rod and one or more elastic rings around the fingers.

5. The camera dolly of claim 1 further including a head at the lower end of the shift rod and a transmission slide lock on the steering transmission moveable to engage the head to lock the shift rod into the steering transmission.

6. The camera dolly of claim 1 further including one or more magnets on the handle bar repelling the shift cap.

7. The camera dolly of claim 1 with the clamp clamping the shift rod with sufficient clamping force to allow the shift cap to actuate the steering transmission, while allowing telescoping movement between the slot tube and the base tube to adjust the height of the steering bar.

8. The camera dolly of claim 1 further including a locking collar on one of the slot tube and the base tube for locking the slot tube against telescoping movement.

9. The camera dolly of claim 1 further including a key fixed on the base tube projecting into a slot in the slot tube, to prevent rotation of the slot tube relative to the base tube.

10. The camera dolly of claim 9 with the slot having a length at least 50% of the length of the slot tube.

11. The camera dolly of claim 10 with the shift rod having a length within 25% of the length of the slot.

12. The camera dolly of claim 1 with the base tube having a tapered lower end and a base tube key for engaging a receiver and a receiver key slot on the steering transmission.

13. The camera dolly of claim 1 further including a tracking bar engageable onto the chassis, with the tracking bar having one or more pins on a tracking bar arm, and with the shift cap engageable onto the pins.

14. The camera dolly of claim 1 further including a tracking bar engageable onto the chassis and having one or more legs, with a head at a lower end of each leg and a chassis slide lock on the chassis movable to lock each leg onto the chassis.

15. A steering handle for a camera dolly, comprising:
a handle bar attached to an upper end of a slot tube, with the slot tube telescopically slidable into or over a base tube;
a locking collar for locking the slot tube at a fixed position on the base tube;
a key preventing rotation of the slot tube relative to the base tube;
a shift rod within the slot tube and the base tube, with an upper end of the shift rod extending through the handle bar;
a shift cap attached to the upper end of the shift rod;
a clamp attached to the slot tube with the clamp in sliding engagement with the shift rod.

16. The steering handle of claim 15 with the clamp having fingers biased radially inwardly onto the shift rod by one or more elastic rings around the fingers.

17. The steering handle of claim 15 further including one or more magnets on the handle bar repelling the shift cap.

18. A steering handle for a camera dolly, comprising:
a handle bar attached to an upper end of a first tube, with the first tube telescopically slidable into or over a second tube;
a key preventing rotation of the first tube relative to the second tube;
a shift rod within the first and second tubes with an upper end of the shift rod extending through the handle bar;

a shift cap attached to the upper end of the shift rod;
a clamp attached to a clamp tube within the first tube, and the shift rod extending through the clamp tube, with the clamp in sliding engagement with the shift rod, and the clamp tube attached to the first tube.

19. The steering handle of claim 18 with the clamp clamping onto the shift rod with sufficient force to allow shifting steering modes of a camera dolly via movement of the shift cap, while also allowing the clamp to slide over the shift rod to adjust the handle bar to a selected height.

20. The steering handle of claim 19 with the clamp preventing relative movement between the shift rod and the first tube unless a force of one pound force or greater is applied between the clamp and the first tube.

* * * * *